United States Patent
Ishii

[11] Patent Number: 6,133,974
[45] Date of Patent: Oct. 17, 2000

[54] LIQUID CRYSTAL DISPLAY WITH TWO AREAS OF LIQUID CRYSTAL WITH ORTHOGONAL INITIAL ORIENTATIONS

[75] Inventor: Toshiya Ishii, Tokyo, Japan

[73] Assignee: NEC Corporation, Tokyo, Japan

[21] Appl. No.: 08/912,476

[22] Filed: Aug. 18, 1997

[30] Foreign Application Priority Data

Aug. 16, 1996 [JP] Japan .................................. 8-216433

[51] Int. Cl.$^7$ .................................................. G02F 1/1337
[52] U.S. Cl. .......................................... 349/129; 349/171
[58] Field of Search .................................. 349/128, 123, 349/129, 171, 134, 37

[56] References Cited

U.S. PATENT DOCUMENTS

| | | | |
|---|---|---|---|
| 3,787,110 | 1/1974 | Berreman et al. | 349/123 |
| 4,563,059 | 1/1986 | Clark et al. | 349/123 |
| 4,832,462 | 5/1989 | Clark et al. | 349/134 |
| 4,836,653 | 6/1989 | Yoshino et al. | 349/128 |
| 4,879,144 | 11/1989 | Nakura et al. | 349/128 |
| 5,172,257 | 12/1992 | Patel | 349/37 |
| 5,305,127 | 4/1994 | Konuma | 349/128 |
| 5,633,740 | 5/1997 | Asaoka et al. | 349/129 |
| 5,638,201 | 6/1997 | Bos et al. | 349/129 |
| 5,757,455 | 5/1998 | Sugiyama et al. | 349/129 |
| 5,781,265 | 7/1998 | Lee | 349/171 |
| 5,790,221 | 8/1998 | Hsieh | 349/128 |
| 5,825,448 | 10/1998 | Bos et al. | 349/128 |
| 5,877,836 | 3/1999 | Miura et al. | 349/129 |

FOREIGN PATENT DOCUMENTS

| | | |
|---|---|---|
| 6-82787 | 3/1994 | Japan . |
| 6-258645 | 9/1994 | Japan . |
| 6-324339 | 11/1994 | Japan . |

OTHER PUBLICATIONS

Noel A. Clark et al., "Submicrosecond bistable electro–optic switching in liquid crystals", pp. 899–901, American Institute of Physics, Appl. Phys. Lett. vol. 36, No. 11, Jun. 1, 1980.

Eiichi Tajima et al., "Inch video graphic array antiferro––electric display", pp. 255–272, Gordon and Breach Science Publishers S.A., Ferroelectrics, vol. 149, 1993.

T. Tanaka et al., "A full–color DHF/AMLCD with wide viewing angle", pp. 430–433, SID 94 Digest.

B. I. Ostrovski et al., "Behaviour of ferroelectric smectic liquid crystals in electric field", pp. 469–483, Advances in Liquide Crystal Research and applications, 1980.

*Primary Examiner*—James A. Dudek
*Attorney, Agent, or Firm*—Young & Thompson

[57] ABSTRACT

A ferroelectric liquid crystal display includes a pair of first and second substrates placed substantially in parallel to each other to form a space between the first and second substrates so that a ferroelectric liquid crystal is provided in the space between the first and second substrates, wherein the ferroelectric liquid crystal is isolated into coexistent separate orientation regions that have crystal orientations which differ by 90 degrees from each other in initial orientation direction of an optical axis of ferroelectric liquid crystal molecules when no electric field is applied to the ferroelectric liquid crystal immediately after the ferroelectric liquid crystal has been injected into the space between the first and second substrates.

34 Claims, 15 Drawing Sheets

| wavelength:550.00nm | |
|---|---|
| Min. (O) =0.06067 | |
| Max. (×) =0.22209 | |
| —●— 0.080 | 0.180 |
| —■— 0.100 | 0.200 |
| —▲— 0.120 | 0.220 |
| —×— 0.140 | |
| —O— 0.160 | |

| wavelength:550.00nm | |
|---|---|
| Min. (O) =0.06067 | |
| Max. (x) =0.22209 | |
| —●— 0.080 | 0.180 |
| —■— 0.100 | 0.200 |
| —▲— 0.120 | 0.220 |
| —x— 0.140 | |
| —O— 0.160 | |

| wavelength:550.00nm | |
|---|---|
| Min. (○) =0.06067 | |
| Max. (×) =0.22209 | |
| —●— 0.080 | 0.180 |
| —■— 0.100 | 0.200 |
| —▲— 0.120 | 0.220 |
| —×— 0.140 | |
| —○— 0.160 | |

LIQUID CRYSTAL DISPLAY WITH TWO AREAS OF LIQUID CRYSTAL WITH ORTHOGONAL INITIAL ORIENTATIONS

BACKGROUND OF THE INVENTION

The present invention relates to a liquid crystal display, and more particularly to a liquid crystal display using ferroelectric or anti-ferroelectric liquid crystal with an improved visible angle dependency.

The liquid crystal display has widely been used in various fields for watches, pocket calculators, word processors and personal computers. The liquid crystal phase used in the liquid crystal display is normally nematic phase. The liquid crystal display using the nematic liquid crystal has a serious problem in visible angle dependency, wherein display may change in color over angles of view since the nematic liquid crystal varies in transmittance of light over view angles. The range of view angle free of any change in color is relatively narrow The following description will focus on the reason why the nematic liquid crystal varies in transmittance of light over view angles. The liquid crystal molecule has a slender shape having a longitudinal axis. The transmittance of light through the liquid crystal depends upon an included angle defined by the longitudinal axis of the slender-shaped liquid crystal molecule and a direction of a ray of light transmitting through the liquid crystal. For a nematic liquid crystal, it is convenient to direct the attention onto the longitudinal axis of the liquid crystal molecules in the center area of a display cell, excluding liquid crystal molecules adjacent to a pair of substrates sandwiching the twisted liquid crystal. If no voltage is applied, the liquid crystal molecules in the center area of the cell are oriented so that the longitudinal axis of the liquid crystal molecules is directed in parallel to the substrate surface. If, however, a voltage is applied, the liquid crystal molecules are moved in a plane vertical to the substrate surface so that the longitudinal axis of the liquid crystal molecules is risen up and tilted from the substrate surface as illustrated in FIG. 1. Since the direction of the ray of light depends upon a relative position of observer to the screen of the display, the included angle defined by both the longitudinal axis of the liquid crystal molecule and the direction of the ray of light is varied depending upon the change in the relative position of observer to the screen of the display. As described above, the transmittance of the light through the liquid crystal depends upon the included angle defined by both the longitudinal axis of the liquid crystal molecule and the direction of the ray of light. FIG. 1 is a schematic view illustrative of the twisted nematic liquid crystal molecule which is tilted and risen up from the substrate surface to explain the dependency upon the view angle of the twisted nematic liquid crystal molecules. For example, as illustrated in FIG. 1, the liquid crystal molecule 5 in the center area of the liquid cell 11 is risen so that the longitudinal direction thereof is tilted from the substrate surface. The ray of light 14a having been transmitted through the liquid crystal cell is largely different in direction from the longitudinal axis of the liquid crystal molecule, for which reason the included angle defined by the longitudinal axis of the liquid crystal molecule and the direction of the ray of light 14a is large. Since the transmittance of the ray of light having been transmitted through the liquid crystal depends upon the included angle defined by the longitudinal axis of the liquid crystal molecule and the direction of the ray of light 14a, the transmittance of the ray of light 14a through the liquid crystal is low. Accordingly, if the observer views the screen in the direction of an arrow mark 13a in parallel to the ray of light 14a, then the transmittance of the ray of light 14a through the liquid crystal is low. In contrast, the ray of light 14b having been transmitted through the liquid crystal cell 11 is almost the same in direction as the longitudinal axis of the liquid crystal molecule, for which reason the included angle defined by the longitudinal axis of the liquid crystal molecule and the direction of the ray of light 14a is small. Since the transmittance of the ray of light having been transmitted through the liquid crystal depends upon the included angle defined by the longitudinal axis of the liquid crystal molecule and the direction of the ray of light 14b, the transmittance of the ray of light 14b through the liquid crystal is high. Accordingly, if the observer views the screen in the direction of an arrow mark 13b in parallel to the ray of light 14b, then the transmittance of the ray of light 14b through the liquid crystal is high. As described above, the nematic or twisted nematic liquid crystal display has the above problem in a remarkable dependency upon the view angle.

In order to settle the above problem in the remarkable dependency upon the view angle, it was proposed to divide the orientation of the twisted nematic liquid crystal molecules into two different orientations over two divided areas for the purpose of reduction in dependency upon the view angle. This technique is disclosed in Japanese laid-open patent publication No. 63-106624. Two types of areas in different two orientation directions co-exit in each pixel. FIG. 2 is a schematic view illustrative of the twisted nematic liquid crystal molecules which are tilted and risen up in different two orientations from the substrate surface to explain the dependency upon the view angle of the twisted nematic liquid crystal molecules. Each pixel is divided into two types of the area differing in orientation by 180 degrees from each other wherein the two types of area co-exist in a local part of each pixel. The two types of the area differ in view angle dependency by 180 degrees from each other and co-exist locally in the each pixel so that the different dependencies of view angle may be canceled totally. If the observer views the screen of the display in a direction of an arrow mark 13a, then the rays of light 14a and 14c are taken into eyes of the observer. In this case, as well illustrated in FIG. 2, the ray of light 14a have been transmitted through the twisted nematic liquid crystal molecule 5 which is risen up toward the right-up direction and tilted from the substrate surface. Since the included angle defined by the transmission direction of the ray of light 14a and the longitudinal axis of the liquid crystal molecule is large, the transmittance of the ray of light 14a is low. In contrast, the ray of light 14c have been transmitted through the twisted nematic liquid crystal molecule 5 which is risen up toward the left-up direction and tilted from the substrate surface. Since the included angle defined by the transmission direction of the ray of light 14c and the longitudinal axis of the liquid crystal molecule is small, the transmittance of the ray of light 14c is high. Since the observer can view both the rays of light 14a and 14c having low and high transmittances, the dependency of the view angle is apparently reduced.

On the other hand, if the observer views the screen of the display in a different direction of an arrow mark 13b, then the rays of light 14b and 14d are taken into eyes of the observer. In this case, as well illustrated in FIG. 2, the ray of light 14b have been transmitted through the twisted nematic liquid crystal molecule 5 which is risen up toward the right-up direction and tilted from the substrate surface. Since the included angle defined by the transmission direction of the ray of light 14b and the longitudinal axis of the liquid crystal molecule is small, the transmittance of the ray of light 14b is high. In contrast, the ray of light 14d have been transmitted through the twisted nematic liquid crystal molecule 5 which is risen up toward the left-up direction and tilted from the substrate surface. Since the included angle defined by the transmission direction of the ray of light 14d and the longitudinal axis of the liquid crystal molecule is large, the transmittance of the ray of light 14d is low. Since the observer can view both the rays of light 14b and 14d having low and high transmittances, the dependency of the view angle is apparently reduced.

The dependency of view angle of the twisted nematic liquid crystal divided into co-existent different two types of area with reference to FIG. 3 which is a view illustrative of the definitions of the direction of observation 13, the polar angle θ and the azimuth angle φ from a liquid crystal cell 11. An evaluation point is set on the origin O on the liquid crystal cell 11 so that the observer observes the evaluation point on the origin O in the observation direction 13 for measurement of the transmittance of light. FIG. 4 is a diagram illustrative of variations in transmittance of light through the twisted nematic liquid crystal divided into co-existent different two types of area of FIG. 3 over variable incident angles when the polar angle is varied in the range of −70 degrees to +70 degrees with the azimuth angle fixed at 90 degrees. The twisted nematic liquid crystal display is gray-scaled. In the range of the polar angle from −40 degrees to +40 degrees, the gray scale is kept in the normal order. If the polar angle is beyond the range of −40 degrees to +40 degrees, the inversion of the gray scale is observed. A distance between adjacent curves of the transmittances is not constant. The compensation to the dependency of view angle by dividing the twisted nematic liquid crystal into the co-existent different two types of area is effective but only within the range of the polar angle from −40 degrees to +40 degrees. If the polar angle is beyond the range of the polar angle from −40 degrees to +40 degrees, this compensation is ineffective. As described above, the twisted nematic liquid crystal has the above problem in narrow visible angle.

In place of such twisted nematic liquid crystal, the ferroelectric liquid crystal having smectic C* phase is attractive due to its relatively wide visible angle. For example, a surface stabilized ferroelectric liquid crystal mode is disclosed as one of the ferroelectric liquid crystal and reported by N. A. Clark and S. T. Lagerawll in Applied Physics Letter Vol. 36 (1989). The ferroelectric liquid crystal is provided in a narrow cell gap so that the ferroelectric liquid crystal has the helical free structure wherein liquid crystal director is in the bistable states depending upon application of a voltage.

Alternatively, a unistable mode liquid crystal is disclosed in Japanese laid-open patent application No. 4-212126. Further alternatively, a deformed helix ferroelectric mode liquid crystal is disclosed in Advances in Liquid Crystal Research and Applications, 1980 p. 469. Further more, anti-ferroelectric liquid crystal is disclosed in Ferro-Electronics Vol. 149, pp. 255.

Those ferroelectric and anti-ferroelectric liquid crystal displays have wide visible angles for the following reasons. Normally, the ferroelectric or anti-ferroelectric liquid crystal is injected into a cell having been treated with parallel or anti-parallel orientation so as to order the longitudinal axis of the liquid crystal molecules. It is also disclosed in Japanese laid-open patent publication No. 4-371925 that, in order to order the longitudinal axis of the liquid crystal molecules, the rubbing direction of an upper substrate crosses to the rubbing direction of a bottom substrate. For those reasons, it is possible to deal with the ferroelectric and anti-ferroelectric liquid crystal as an uniaxial double refraction liquid crystal. In this model, the liquid crystal molecules lie so that the longitudinal axis of the liquid crystal molecules is parallel to the substrate surface. Upon application of the voltage or no application of the voltage, the liquid crystal molecules shows such a motion that the ends of the longitudinal axis thereof rotates around the normal of the substrate surface and in a plane parallel to the substrate surface so that the locus of the longitudinal axis on rotation draws two cones which tops faces to each other. FIG. 5 is a schematic view illustrative of the ferroelectric or anti-ferroelectric liquid crystal molecules showing a rotation motion such the locus of the longitudinal axis on rotation draws two cones which tops faces to each other. Similarly to the twisted nematic liquid crystals, the transmittance of light through the ferroelectric or anti-ferroelectric liquid crystal depends upon the included angle defined by both the longitudinal axis of the ferroelectric or anti-ferroelectric liquid crystal molecules and the direction of the ray of light having been transmitted through the ferroelectric or anti-ferroelectric liquid crystal. In FIG. 5, two rays of light 14a and 14b have been transmitted through a ferroelectric or anti-ferroelectric liquid crystal molecule 5. If the observer views the display screen in a direction 13a, then the observer observes the ray of light 14a. If, however, the observer views the display screen in a direction 13b, then the observer observes the ray of light 14b. The included angle defined between the direction of the ray of light 14a and the longitudinal axis of the ferroelectric or anti-ferroelectric liquid crystal molecule 5 is equal to the included angle defined between the direction of the ray of light 14b and the longitudinal axis of the ferroelectric or anti-ferroelectric liquid crystal molecule 5, for which reason the transmitance of the ray of light 14a is the same as that of the ray of light 14b. The observer can observe the same quality of photon or the intensity of light both in the directions 13a and 13b. This means that if the viewer direction is tilted and varied, then the transmittance of the ray of light through the ferroelectric or anti-ferroelectric liquid crystal molecule 5 is symmetrically varied. This can been said when the display is gray-scaled. Namely, even if the display is gray-scaled, then the transmittance of the ray of light through the ferroelectric or anti-ferroelectric liquid crystal molecule 5 is symmetrically varied. FIG. 6 is a diagram illustrative of variations in transmittance of the ray of light versus incident angle or view angle in causes of applications of various voltages V0<V01<V2<V3 for realizing four gray-scale display, wherein polar angle of the view direction is varied in the range of −70 degrees to +70 degrees toward directions having the azimuth angles of 0 degree and 180 degrees. The transmittances of the ray of light are varied symmetrically with reference to the zero polar angle of the view direction. No inversion on gray scale appears not only in the small polar angle range but also near the polar angle of +70 degrees when the voltages V0, V1 and V3 are applied.

In case of application of the voltage V2, there still remains the problem in dependency upon view angle. Namely, the transmittance of the ray of light increases as the incident angle approaches ±50 degrees. As the incident angle or the view angle approaches zero, the transmittance of the ray of light decreases and is lower by near 10% from when the incident angle approaches ±50 degrees. The ferroelectric or anti-ferroelectric liquid crystal display shows symmetrical variations in transmittance of the ray of light over incident angles for all of the four gray-scales corresponding to V0, V1, V2 and V3. Notwithstanding, in the intermediate gray scale corresponding to V2, the transmittance of the ray of light is lower in the front view or at the zero polar angle and as the view direction is tilted from the front view, the transmittance of the ray of light increases.

The above described ferroelectric or anti-ferroelectric liquid crystal display has another problem in flicker in driving the display. Generally, the liquid crystal display is driven by alternating current driving wherein periodical applications of positive and subsequent negative voltages are made in order to avoid destruction of the liquid crystal due to a direct current component. The ferroelectric or anti-ferroelectric liquid crystal display utilizes the interaction between electric field and spontaneous polarization, for which reason the ferroelectric or anti-ferroelectric liquid crystal changes in orientation in accordance with the polarity of the applied voltage. In the light of optical responsibility, the change in orientation of the ferroelectric or anti-ferroelectric liquid crystal molecules corresponds to that the longitudinal axis of the ferroelectric or anti-ferroelectric liquid crystal rotates around the normal of the substrate surface and the ends of the ferroelectric or anti-ferroelectric liquid crystal rotate in a plane parallel to the substrate surface so that the locus of the longitudinal axis on rotation draws two cones which tops faces to each other.

If the observer views the display screen in the front direction, then the observer views the ray of light having been transmitted through the ferroelectric or anti-ferroelectric liquid crystal molecules in a direction parallel to the normal of the substrate surface, for which reason the included angle defined between the ray of light and the longitudinal axis of the ferroelectric or anti-ferroelectric liquid crystal molecules remains unchanged when the longitudinal axis of the ferroelectric or anti-ferroelectric liquid crystal rotates around the normal of the substrate surface and the ends of the ferroelectric or anti-ferroelectric liquid crystal rotate in a plane parallel to the substrate surface so that the locus of the longitudinal axis on rotation draws two cones which tops faces to each other. Since the transmittance of the ray of light through the ferroelectric or anti-ferroelectric liquid crystal depends upon the included angle defined between the ray of light and the longitudinal axis of the ferroelectric or anti-ferroelectric liquid crystal molecules, the transmittance remains unchanged during the above rotation motion of the ferroelectric or anti-ferroelectric liquid crystal molecules.

If, however, the observer views the display screen in the oblique direction, then the observer views the ray of light having been transmitted through the ferroelectric or anti-ferroelectric liquid crystal molecules in a direction tilted from the normal of the substrate surface, for which reason the included angle defined between the ray of light and the longitudinal axis of the ferroelectric or anti-ferroelectric liquid crystal molecules is changed when the longitudinal axis of the ferroelectric or anti-ferroelectric liquid crystal rotates around the normal of the substrate surface and the ends of the ferroelectric or anti-ferroelectric liquid crystal rotate in a plane parallel to the substrate surface so that the locus of the longitudinal axis on rotation draws two cones which tops faces to each other. Since the transmittance of the ray of light through the ferroelectric or anti-ferroelectric liquid crystal depends upon the included angle defied between the ray of light and the longitudinal axis of the ferroelectric or anti-ferroelectric liquid crystal molecules, the transmittance is changed during the above rotation motion of the ferroelectric or anti-ferroelectric liquid crystal molecules. Actually, if the frequency of the applied voltage is about 60 Hz, then the phenomenon of flicker appears. The above problem with the flicker prevents realization of the fill color wide view angle liquid crystal display.

In the above circumstances, it is required to develop a novel ferroelectric or anti-ferroelectric liquid crystal display within an improved dependency of view angle and being free from flicker in alternating current driving the display.

SUMMARY OF THE INVENTION

Accordingly, it is an object of the present invention to provide a novel ferroelectric or anti-ferroelectric liquid crystal display free from the problems as described above.

It is a further object of the present invention to provide a novel ferroelectric or anti-ferroelectric liquid crystal display within an improved dependency of view angle.

It is a further object of the present invention to provide a novel ferroelectric or anti-ferroelectric liquid crystal display free from flicker in alternating current driving the display.

The above and other objects, features and advantages of the present invention will be apparent from the following descriptions.

The first present invention provides a ferroelectric liquid crystal display including a pair of first and second substrates placed substantially in parallel to each other to form a space between the first and second substrates so that a ferroelectric liquid crystal is provided in the space between the first and second substrates, wherein the ferroelectric liquid crystal is isolated into co-existent different two types of local areas which differ by 90 degrees from each other in initial orientation direction toward which an optical axis of ferroelectric liquid crystal molecules is directed under no electric field applied to the ferroelectric liquid crystal immediately after the ferroelectric liquid crystal has been injected into the space between the first and second substrates.

The second present invention provides an anti-ferroelectric liquid crystal display including a pair of first and second substrates placed substantially in parallel to each other to form a space between the first and second substrates so that an anti-ferroelectric liquid crystal is provided in the space between the first and second substrates, wherein the anti-ferroelectric liquid crystal is isolated into co-existent different two types of local areas which differ by 90 degrees from each other in initial orientation direction toward which an optical axis of anti-ferroelectric liquid crystal molecules is directed under no electric field applied to the anti-ferroelectric liquid crystal immediately after the anti-ferroelectric liquid crystal has been injected into the space between the first and second substrates.

The third present invention provides a ferroelectric liquid crystal display comprising the following elements. A pair of first and second substrates is placed substantially in parallel to each other to form a space between the first and second substrates. A first orientation film is provided which extends over an inner surface of the first substrate so that the first orientation film facing to the space. A second orientation film is provided which extends over an inner surface of the second substrate so that the second orientation film facing to the space. A ferroelectric liquid crystal is provided in the space between the first and second orientation films, wherein entire parts of the first orientation film are unidirectionally oriented to have a first orientation direction and entire parts of the second orientation film are unidirectionally oriented to have a second orientation direction which differs from the first orientation direction by the right angle.

The fourth present invention provides an anti-ferroelectric liquid crystal display comprising the following elements. A pair of first and second substrates is placed substantially in parallel to each other to form a space between the first and second substrates. A first orientation film is provided which extends over an inner surface of the first substrate so that the first orientation film facing to the space. A second orientation film is provided which extends over an inner surface of the second substrate so that the second orientation film facing to the space. An anti-ferroelectric liquid crystal is provided in the space between the first and second orientation films, wherein entire parts of the first orientation film are unidirectionally oriented to have a first orientation direction and entire parts of the second orientation film are unidirectionally oriented to have a second orientation direction which differs from the first orientation direction by the right angle.

The fifth present invention provides a ferroelectric liquid crystal display comprising the following elements. A pair of first and second substrates is placed substantially in parallel to each other to form a space between the first and second substrates. A first orientation film is provided which extends over an inner surface of the first substrate so that the first orientation film facing to the space. A second orientation film is provided which extends over an inner surface of the second substrate so that the second orientation film facing to the space. A ferroelectric liquid crystal is provided in the space between the first and second orientation films, wherein the first orientation film is divided into first and second areas in each pixel so that the first area is unidirectionally oriented to have a first orientation direction and the second area is unidirectionally oriented to have a second orientation direction which differs from the first orientation direction by the right angle, and wherein the second orientation film is divided into third and fourth areas in each pixel, and the third area is positioned in correspondence to the first area in a plane view and the fourth area is positioned in correspondence to the second area in the plane view so that the third area is unidirectionally oriented to have a third orientation direction being parallel to the first orientation direction and the fourth area is unidirectionally oriented to have a fourth orientation direction being parallel to the second orientation direction whereby the fourth orientation direction differs from the third orientation direction by the right angle.

The sixth present invention provides an anti-ferroelectric liquid crystal display comprising the following elements. A pair of first and second substrates is placed substantially in parallel to each other to form a space between the first and second substrates. A first orientation film is provided which extends over an inner surface of the first substrate so that the first orientation film facing to the space. A second orientation film is provided which extends over an inner surface of the second substrate so that the second orientation film facing to the space. An anti-ferroelectric liquid crystal provided in the space between the first and second orientation films, wherein the first orientation film is divided into first and second areas in each pixel so that the first area is unidirectionally oriented to have a first orientation direction and the second area is unidirectionally oriented to have a second orientation direction which differs from the first orientation direction by the right angle, and wherein the second orientation film is divided into third and fourth areas in each pixel, and the third area is positioned in correspondence to the first area in a plane view and the fourth area is positioned in correspondence to the second area in the plane view so that the third area is unidirectionally oriented to have a third orientation direction being parallel to the first orientation direction and the fourth area is unidirectionally oriented to have a fourth orientation direction being parallel to the second orientation direction whereby the fourth orientation direction differs from the third orientation direction by the right angle.

The seventh present invention provides a ferroelectric liquid crystal display comprising the following elements. A pair of first and second substrates placed substantially in parallel to each other to form a space between the first and second substrates. A first orientation film is provided which extends over an inner surface of the first substrate so that the first orientation film facing to the space. A second orientation film is provided which extends over an inner surface of the second substrate so that the second orientation film facing to the space. A ferroelectric liquid crystal is provided in the space between the first and second orientation films, wherein the first orientation film is divided into first and second areas in each pixel so that the first area is unidirectionally oriented to have a first orientation direction and the second area is unidirectionally oriented to have a second orientation direction which differs from the first orientation direction by the right angle, and wherein the second orientation film is divided into third and fourth areas in each pixel, and the third area is positioned in correspondence to the first area in a plane view and the fourth area is positioned in correspondence to the second area in the plane view so that the third area is unidirectionally oriented to have a third orientation direction being parallel to the first orientation direction and the fourth area is unidirectionally oriented to have a fourth orientation direction being anti-parallel to the second orientation direction whereby the fourth orientation direction differs from the third orientation direction by the right angle.

The eighth present invention provides an anti-ferroelectric liquid crystal display comprising the following elements. A pair of first and second substrates is placed substantially in parallel to each other to form a space between the first and second substrates. A first orientation film is provided which extends over an inner surface of the first substrate so that the first orientation film facing to the space. A second orientation film is provided which extends over an inner surface of the second substrate so that the second orientation film facing to the space. An anti-ferroelectric liquid crystal is provided in the space between the first and second orientation films, wherein the first orientation film is divided into first and second areas in each pixel so that the first area is unidirectionally oriented to have a first orientation direction and the second area is unidirectionally oriented to have a second orientation direction which differs from the first orientation direction by the right angle, and wherein the second orientation film is divided into third and fourth areas in each pixel, and the third area is positioned in correspondence to the first area in a plane view and the fourth area is positioned in correspondence to the second area in the plane view so that the third area is unidirectionally oriented to have a third orientation direction being anti-parallel to the first orientation direction and the fourth area is unidirectionally oriented to have a fourth orientation direction being anti-parallel to the second orientation direction whereby the fourth orientation direction differs from the third orientation direction by the right angle.

The ninth present invention provides a ferroelectric liquid crystal display comprising the following elements. A pair of first and second substrates is placed substantially in parallel to each other to form a space between the first and second substrates. A first orientation film is provided which extends over an inner surface of the first substrate so that the first orientation film facing to the space. A second orientation film is provided which extends over an inner surface of the second substrate so that the second orientation film facing to the space. A ferroelectric liquid crystal is provided in the space between the first and second orientation films, wherein entire parts of the first orientation film are unidirectionally oriented to have a first orientation direction and entire parts of the second orientation film are unidirectionally oriented to have a second orientation direction which differs from the first orientation direction by an angle of 90 degrees+2α, where α is an angle by which an optical axis of the ferroelectric liquid crystal differs in a clockwise direction from a unidirectional orientation direction of one of the first and second orientation films when the remaining one of the first and second orientation films is not oriented.

The tenth present invention provides an anti-ferroelectric liquid crystal display comprising the following elements. A pair of first and second substrates is placed substantially in parallel to each other to form a space between the first and second substrates. A first orientation film is provided extends over an inner surface of the first substrate so that the first orientation film facing to the space. A second orientation film is provided which extends over an inner surface of the second substrate so that the second orientation film facing to the space. An anti-ferroelectric liquid crystal is provided in the space between the first and second orientation films, wherein entire parts of the first orientation film are unidirectionally oriented to have a first orientation direction and entire parts of the second orientation film are unidirectionally oriented to have a second orientation direction which differs from the first orientation direction by an angle of 90 degrees+2α, where α is an angle by which an optical axis of the anti-ferroelectric liquid crystal differs in a clockwise direction from a unidirectional orientation direction of one of the first and second orientation films when the remaining one of the first and second orientation films is not oriented.

The eleventh present invention provides a ferroelectric liquid crystal display comprising the following elements. A pair of first and second substrates is placed substantially in parallel to each other to form a space between the first and second substrates. A first orientation film is provided which extends over an inner surface of the first substrate so that the first orientation film facing to the space. A second orientation film is provided which extends over an inner surface of the second substrate so that the second orientation film facing to the space. A ferroelectric liquid crystal is provided in the space between the first and second orientation films, wherein entire parts of the first orientation film are unidirectionally oriented to have a first orientation direction and entire parts of the second orientation film are unidirectionally oriented to have a second orientation direction which differs from the first orientation direction by an angle of 90 degrees−2α, where α is an angle by which an optical axis of the ferroelectric liquid crystal differs in a clockwise direction from a unidirectional orientation direction of one of the first and second orientation films when the remaining one of the first and second orientation films is not oriented.

The twelfth present invention provides an anti-ferroelectric liquid crystal display comprising the following elements. A pair of first and second substrates is placed substantially in parallel to each other to form a space between the first and second substrates. A first orientation film is provided which extends over an inner surface of the first substrate so that the first orientation film facing to the space. A second orientation film is provided which extends over an inner surface of the second substrate so that the second orientation film facing to the space. An anti-ferroelectric liquid crystal is provided in the space between the first and second orientation films, wherein entire parts of the first orientation film are unidirectionally oriented to have a first orientation direction and entire parts of the second orientation film are unidirectionally oriented to have a second orientation direction which differs from the first orientation direction by an angle of 90 degrees−2α, where α is an angle by which an optical axis of the anti-ferroelectric liquid crystal differs in a clockwise direction from a unidirectional orientation direction of one of the first and second orientation films when the remaining one of the first and second orientation films is not oriented.

BRIEF DESCRIPTION OF THE DRAWINGS

Preferred embodiments according to the present invention will be described in detail with reference to the accompanying drawings.

DISCLOSURE OF THE INVENTION

Figure 1:
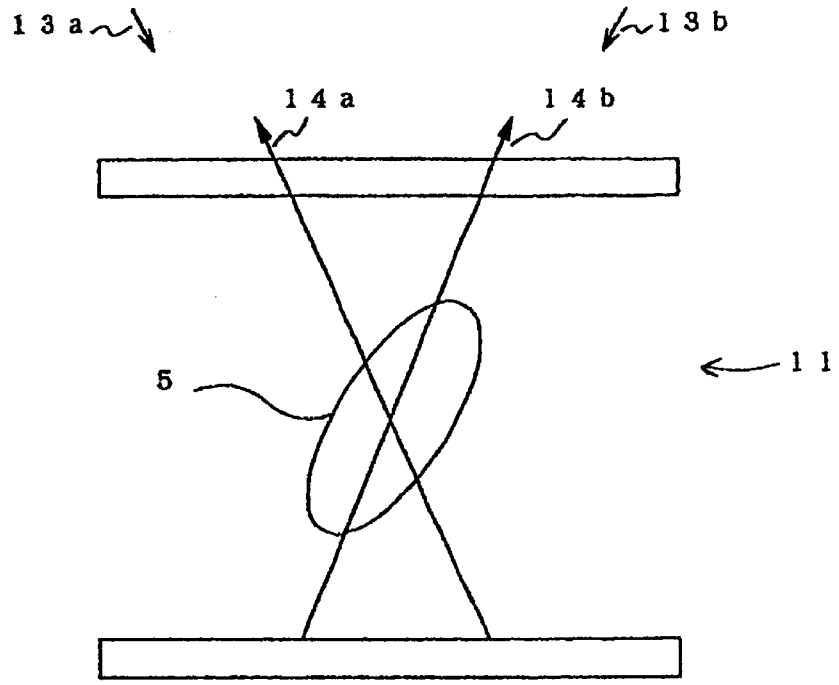
FIG. 1 is a schematic view illustrative of the twisted nematic liquid crystal molecule which is tilted and risen up from the substrate surface to explain the dependency upon the view angle of the twisted nematic liquid crystal molecules in the first conventional liquid crystal display.
Figure 2:
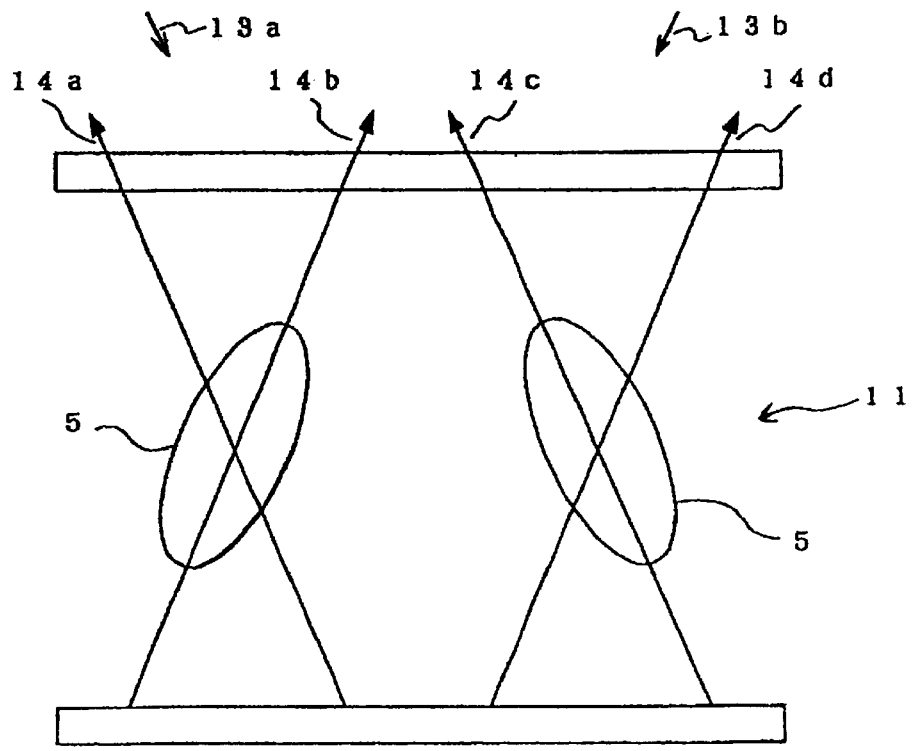
FIG. 2 is a schematic view illustrative of the twisted nematic liquid crystal molecules which are tilted and risen up in different two orientations from the substrate surface to explain the dependency upon the view angle of the twisted nematic liquid crystal molecules in the second conventional liquid crystal display.
Figure 3:
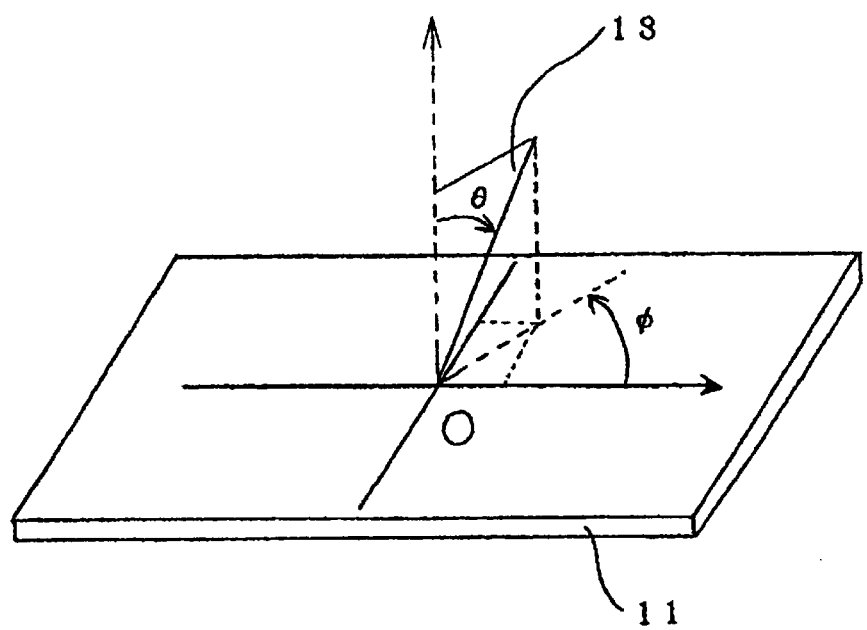
FIG. 3 is a view illustrative of the definitions of the direction of observation 13, the polar angle θ and the azimuth angle φ from a liquid crystal cell 11.
Figure 4:
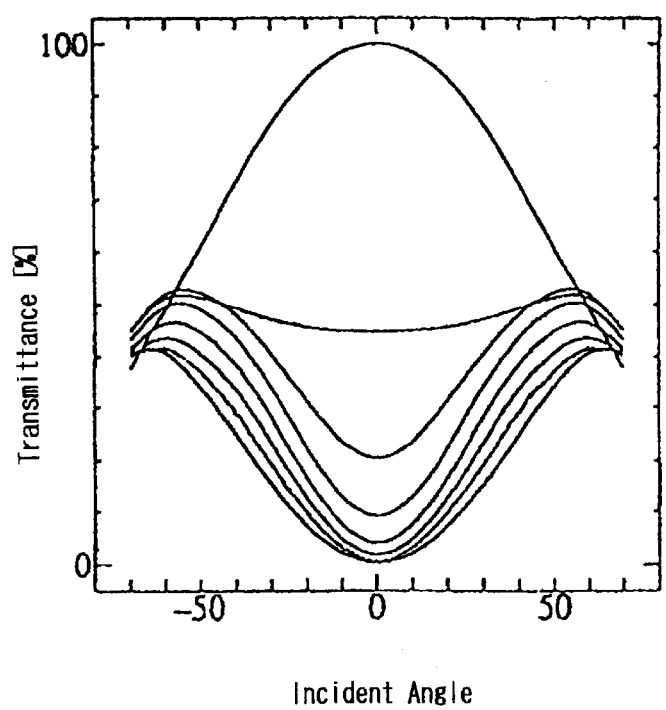
FIG. 4 is a diagram illustrative of variations in transmittance of light through the twisted nematic liquid crystal divided into co-existent different two types of area of FIG. 3 over variable incident angles when the polar angle is varied in the range of −70 degrees to +70 degrees with the azimuth angle fixed at 90 degrees.
Figure 5:
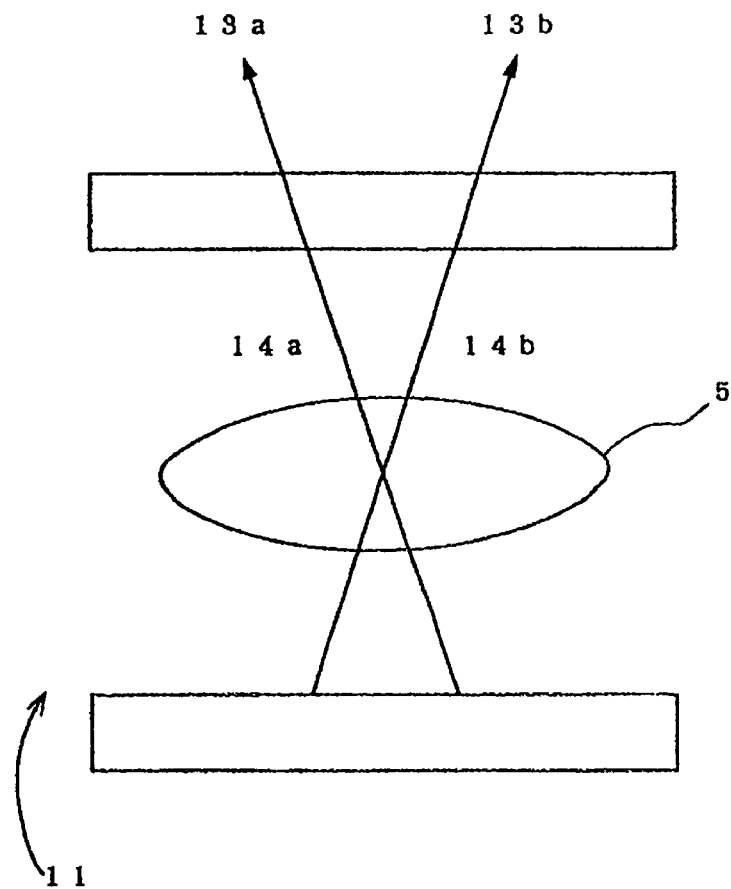
FIG. 5 is a schematic view illustrative of the ferroelectric or anti-ferroelectric liquid crystal molecules showing a rotation motion such the locus of the longitudinal axis on rotation draws two cones which tops faces to each other.
Figure 6:
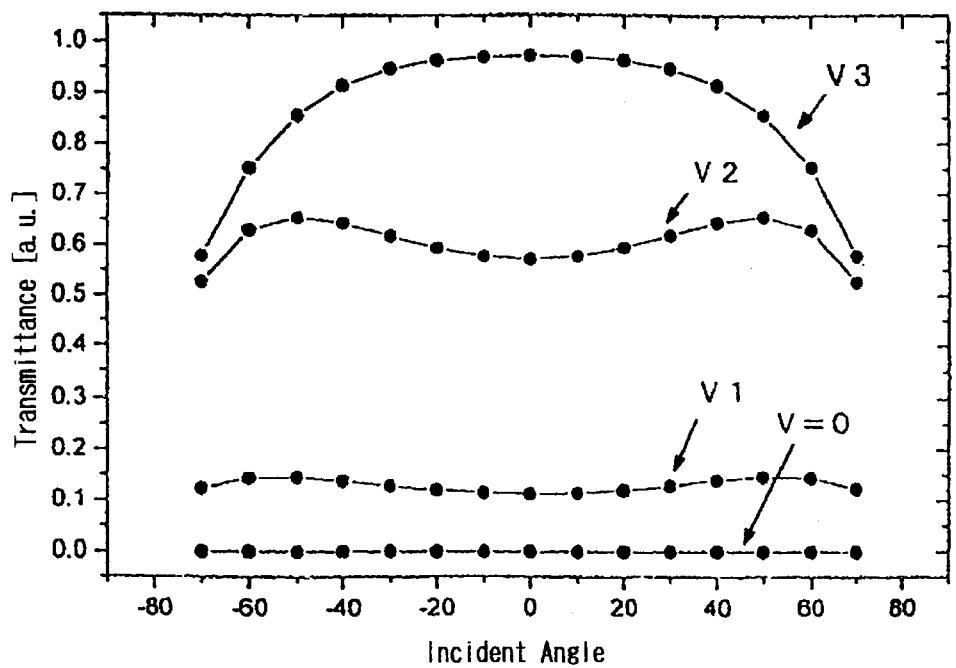
FIG. 6 is a diagram illustrative of variations in transmittance of the ray of light versus incident angle or view angle in causes of applications of various voltages V0<V01<V2<V3 for realizing four gray-scale display, wherein polar angle of the view direction is varied in the range of −70 degrees to +70 degrees toward directions having the azimuth angles of 0 degree and 180 degrees.

The first present invention provides a ferroelectric liquid crystal display including a pair of first and second substrates placed substantially in parallel to each other to form a space between the first and second substrates so that a ferroelectric liquid crystal is provided in the space between the first and second substrates, wherein the ferroelectric liquid crystal is isolated into co-existent different two types of local areas which differ by 90 degrees from each other in initial orientation direction toward which an optical axis of ferroelectric liquid crystal molecules is directed under no electric field applied to the ferroelectric liquid crystal immediately after the ferroelectric liquid crystal has been injected into the space between the first and second substrates.

It is preferable to further provide a first orientation film extending over an inner surface of the first substrate so that the first orientation film facing to the space, and a second orientation film extending over an inner surface of the second substrate so that the second orientation film facing to the space, wherein entire parts of the first orientation film are unidirectionally oriented to have a first orientation direction and entire parts of the second orientation film are unidirectionally oriented to have a second orientation direction which differs from the first orientation direction by the right angle.

It is also preferable to further provide a first orientation film extending over an inner surface of the first substrate so that the first orientation film facing to the space, and a second orientation film extending over an inner surface of the second substrate so that the second orientation film facing to the space, wherein the first orientation film is divided into first and second areas in each pixel so that the first area is unidirectionally oriented to have a first orientation direction and the second area is unidirectionally oriented to have a second orientation direction which differs from the first orientation direction by the right angle, and wherein the second orientation film is divided into third and fourth areas in each pixel, and the third area is positioned in correspondence to the first area in a plane view and the fourth area is positioned in correspondence to the second area in the plane view so that the third area is unidirectionally oriented to have a third orientation direction being parallel to the first orientation direction and the fourth area is unidirectionally oriented to have a fourth orientation direction being parallel to the second orientation direction whereby the fourth orientation direction differs from the third orientation direction by the right angle.

It is also preferable to fisher provide a first orientation film extending over an inner surface of the first substrate so that the first orientation film facing to the space, and a second orientation film extending over an inner surface of the second substrate so that the second orientation film facing to the space, wherein the first orientation film is divided into first and second areas in each pixel so that the first area is unidirectionally oriented to have a first orientation direction and the second area is unidirectionally oriented to have a second orientation direction which differs from the first orientation direction by the right angle, and wherein the second orientation film is divided into third and fourth areas in each pixel, and the third area is positioned in correspondence to the first area in a plane view and the fourth area is positioned in correspondence to the second area in the plane view so that the third area is unidirectionally oriented to have a third orientation direction being parallel to the first orientation direction and the fourth area is unidirectionally oriented to have a fourth orientation direction being anti-parallel to the second orientation direction whereby the fourth orientation direction differs from the third orientation direction by the right angle.

It is also preferable to further provide a first orientation film extending over an inner surface of the first substrate so that the first orientation film facing to the space, and a second orientation film extending over an inner surface of the second substrate so that the second orientation film facing to the space, wherein entire parts of the first orientation film are unidirectionally oriented to have a first orientation direction and entire parts of the second orientation film are unidirectionally oriented to have a second orientation direction which differs from the first orientation direction by an angle of 90 degrees+2α, where α is an angle by which an optical axis of the ferroelectric liquid crystal differs in a clockwise direction from a unidirectional orientation direction of one of the first and second orientation films when the remaining one of the first and second orientation films is not oriented.

It is also preferable to further provide a first orientation film extending over an inner surface of the first substrate so that the first orientation film facing to the space, and a second orientation film extending over an inner surface of the second substrate so that the second orientation film facing to the space, wherein entire parts of the first orientation film are unidirectionally oriented to have a first orientation direction and entire parts of the second orientation film are unidirectionally oriented to have a second orientation direction which differs from the first orientation direction by an angle of 90 degrees−2α, where α is an angle by which an optical axis of the ferroelectric liquid crystal differs in a clockwise direction from a unidirectional orientation direction of one of the first and second orientation films when the remaining one of the first and second orientation films is not oriented.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the first polarizing direction corresponds to the first orientation direction.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the first polarizing direction corresponds to an initial orientation direction of any one of the co-existent different two types of the local areas.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the second polarizing direction corresponds to an initial orientation direction of any one of the co-existent different two types of the local areas.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction in parallel to the first polarizing direction, wherein the first and second polarizing directions correspond to an initial orientation direction of any one of the co-existent different two types of the local areas.

The second present invention provides an anti-ferroelectric liquid crystal display including a pair of first and second substrates placed substantially in parallel to each other to form a space between the first and second substrates so that an anti-ferroelectric liquid crystal is provided in the space between the first and second substrates, wherein the anti-ferroelectric liquid crystal is isolated into co-existent different two types of local areas which differ by 90 degrees from each other in initial orientation direction toward which an optical axis of anti-ferroelectric liquid crystal molecules is directed under no electric field applied to the anti-ferroelectric liquid crystal immediately after the anti-ferroelectric liquid crystal has been injected into the space between the first and second substrates.

It is preferable to further provide a first orientation film extending over an inner surface of the first substrate so that the first orientation film facing to the space, and a second orientation film extending over an inner surface of the second substrate so that the second orientation film facing to the space, wherein entire parts of the first orientation film are unidirectionally oriented to have a first orientation direction and entire parts of the second orientation film are unidirectionally oriented to have a second orientation direction which differs from the first orientation direction by the right angle.

It is also preferable to further provide a first orientation film extending over an inner surface of the first substrate so that the first orientation film facing to the space, and a second orientation film extending over an inner surface of the second substrate so that the second orientation film facing to the space, wherein the first orientation film is divided into first and second areas in each pixel so that the first area is unidirectionally oriented to have a first orientation direction and the second area is unidirectionally oriented to have a second orientation direction which differs from the first orientation direction by the right angle, and wherein the second orientation film is divided into third and fourth areas in each pixel, and the third area is positioned in correspondence to the first area in a plane view and the fourth area is positioned in correspondence to the second area in the plane view so that the third area is unidirectionally oriented to have a third orientation direction being parallel to the first orientation direction and the fourth area is unidirectionally oriented to have a fourth orientation direction being parallel to the second orientation direction whereby the fourth orientation direction differs from the third orientation direction by the right angle.

It is also preferable to further provide a first orientation film extending over an inner surface of the first substrate so that the first orientation film facing to the space, and a second orientation film extending over an inner surface of the second substrate so that the second orientation film facing to the space, wherein the first orientation film is divided into first and second areas in each pixel so that the first area is unidirectionally oriented to have a first orientation direction and the second area is unidirectionally oriented to have a second orientation direction which differs from the first orientation direction by the right angle, and wherein the second orientation film is divided into third and fourth areas in each pixel, and the third area is positioned in correspondence to the first area in a plane view and the fourth area is positioned in correspondence to the second area in the plane view so that the third area is unidirectionally oriented to have a third orientation direction being parallel to the first orientation direction and the fourth area is unidirectionally oriented to have a fourth orientation direction being anti-parallel to the second orientation direction whereby the fourth orientation direction differs from the third orientation direction by the right angle.

It is also preferable to further provide a first orientation film extending over an inner surface of the first substrate so that the first orientation film facing to the space, and a second orientation film extending over an inner surface of the second substrate so that the second orientation film facing to the space, wherein entire parts of the first orientation film are unidirectionally oriented to have a first orientation direction and entire parts of the second orientation film are unidirectionally oriented to have a second orientation direction which differs from the first orientation direction by an angle of 90 degrees+2α, where α is an angle by which an optical axis of the anti-ferroelectric liquid crystal differs in a clockwise direction from a unidirectional orientation direction of one of the first and second orientation films when the remaining one of the first and second orientation films is not oriented.

It is also preferable to further provide a first orientation film extending over an inner surface of the first substrate so that the first orientation film facing to the space, and a second orientation film extending over an inner surface of the second substrate so that the second orientation film facing to the space, wherein entire parts of the first orientation film are unidirectionally oriented to have a first orientation direction and entire parts of the second orientation film are unidirectionally oriented to have a second orientation direction which differs from the first orientation direction by an angle of 90 degrees−2α, where α is an angle by which an optical axis of the anti-ferroelectric liquid crystal differs in a clockwise direction from a unidirectional orientation direction of one of the first and second orientation films when the remaining one of the first and second orientation films is not oriented.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the first polarizing direction corresponds to the first orientation direction.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the first polarizing direction corresponds to an initial orientation direction of any one of the co-existent different two types of the local areas.

It is also preferable to farther provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the second polarizing direction corresponds to an initial orientation direction of any one of the co-existent different two types of the local areas.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction in parallel to the first polarizing direction, wherein the first and second polarizing directions correspond to an initial orientation direction of any one of the co-existent different two types of the local areas.

The third present invention provides a ferroelectric liquid crystal display comprising the following elements. A pair of first and second substrates is placed substantially in parallel to each other to form a space between the first and second substrates. A first orientation film is provided which extends over an inner surface of the first substrate so that the first orientation film facing to the space. A second orientation film is provided which extends over an inner surface of the second substrate so that the second orientation film facing to the space. A ferroelectric liquid crystal is provided in the space between the first and second orientation films, wherein entire parts of the first orientation film are unidirectionally oriented to have a first orientation direction and entire parts of the second orientation film are unidirectionally oriented to have a second orientation direction which differs from the first orientation direction by the right angle.

It is preferable that the ferroelectric liquid crystal is isolated into co-existent different two types of local areas which differ by 90 degrees from each other in initial orientation direction toward which an optical axis of ferroelectric liquid crystal molecules is directed under no electric field applied to the ferroelectric liquid crystal immediately after the ferroelectric liquid crystal has been injected into the space between the first and second substrates.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the first polarizing direction corresponds to the first orientation direction.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the first polarizing direction corresponds to the second orientation direction.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the second polarizing direction corresponds to the first orientation direction.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the second polarizing direction corresponds to the second orientation direction.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction in parallel to the first polarizing direction, wherein the first and second polarizing directions correspond to the first orientation direction.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction in parallel to the first polarizing direction, wherein the first and second polarizing directions correspond to the second orientation direction.

It is also preferable that the co-existent different two types of the local areas have substantially the same area as each other.

It is also preferable that the co-existent different two types of the local areas are uniformly distributed.

The fourth present invention provides an anti-ferroelectric liquid crystal display comprising the following elements. A pair of first and second substrates is placed substantially in parallel to each other to form a space between the first and second substrates. A first orientation film is provided which extends over an inner surface of the first substrate so that the first orientation film facing to the space. A second orientation film is provided which extends over an inner surface of the second substrate so that the second orientation film facing to the space. An anti-ferroelectric liquid crystal is provided in the space between the first and second orientation films, wherein entire parts of the first orientation film are unidirectionally oriented to have a first orientation direction and entire parts of the second orientation film are unidirectionally oriented to have a second orientation direction which differs from the first orientation direction by the right angle.

It is preferable that the anti-ferroelectric liquid crystal is isolated into co-existent different two types of local areas which differ by 90 degrees from each other in initial orientation direction toward which an optical axis of anti-ferroelectric liquid crystal molecules is directed under no electric field applied to the anti-ferroelectric liquid crystal immediately after the anti-ferroelectric liquid crystal has been injected into the space between the first and second substrates.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the first polarizing direction corresponds to the first orientation direction.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the first polarizing direction corresponds to the second orientation direction.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the second polarizing direction corresponds to the first orientation direction.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the second polarizing direction corresponds to the second orientation direction.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction in parallel to the first polarizing direction, wherein the first and second polarizing directions correspond to the first orientation direction.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction in parallel to the first polarizing direction, wherein the first and second polarizing directions correspond to the second orientation direction.

It is also preferable that the co-existent different two types of the local areas have substantially the same area as each other.

It is also preferable that the co-existent different two types of the local areas are uniformly distributed.

The fifth present invention provides a ferroelectric liquid crystal display comprising the following elements. A pair of first and second substrates is placed substantially in parallel to each other to form a space between the first and second substrates. A first orientation film is provided which extends over an inner surface of the first substrate so that the first orientation film facing to the space. A second orientation film is provided which extends over an inner surface of the second substrate so that the second orientation film facing to the space. A ferroelectric liquid crystal is provided in the space between the first and second orientation films, wherein the first orientation film is divided into first and second areas in each pixel so that the first area is unidirectionally oriented to have a first orientation direction and the second area is unidirectionally oriented to have a second orientation direction which differs from the first orientation direction by the right angle, and wherein the second orientation film is divided into third and fourth areas in each pixel, and the third area is positioned in correspondence to the first area in a plane view and the fourth area is positioned in correspondence to the second area in the plane view so that the third area is unidirectionally oriented to have a third orientation direction being parallel to the first orientation direction and the fourth area is unidirectionally oriented to have a fourth orientation direction being parallel to the second orientation direction whereby the fourth orientation direction differs from the third orientation direction by the right angle.

It is preferable that the ferroelectric liquid crystal is isolated into different two types of the first and third areas and of the second and fourth areas which differ by 90 degrees from each other in initial orientation direction toward which an optical axis of ferroelectric liquid crystal molecules is directed under no electric field applied to the ferroelectric liquid crystal immediately after the ferroelectric liquid crystal has been injected into the space between the first and second substrates.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the first polarizing direction corresponds to the first and third orientation directions.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the first polarizing direction corresponds to the second and fourth orientation directions.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the second polarizing direction corresponds to the first and third orientation directions.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the second polarizing direction corresponds to the second and fourth orientation directions.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction in parallel to the first polarizing direction, wherein the first and second polarizing directions correspond to the first and third orientation directions.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction in parallel to the first polarizing direction, wherein the first and second polarizing directions correspond to the second and fourth orientation directions.

It is also preferable that the first and second areas have substantially the same area as each other.

It is also preferable that the first and second areas are uniformly distributed.

The sixth present invention provides an anti-ferroelectric liquid crystal display comprising the following elements. A pair of first and second substrates is placed substantially in parallel to each other to form a space between the first and second substrates. A first orientation film is provided which extends over an inner surface of the first substrate so that the first orientation film facing to the space. A second orientation film is provided which extends over an inner surface of the second substrate so that the second orientation film facing to the space. An anti-ferroelectric liquid crystal provided in the space between the first and second orientation films, wherein the first orientation film is divided into first and second areas in each pixel so that the first area is unidirectionally oriented to have a first orientation direction and the second area is unidirectionally oriented to have a second orientation direction which differs from the first orientation direction by the right angle, and wherein the second orientation film is divided into third and fourth areas in each pixel, and the third area is positioned in correspondence to the first area in a plane view and the fourth area is positioned in correspondence to the second area in the plane view so that the third area is unidirectionally oriented to have a third orientation direction being parallel to the first orientation direction and the fourth area is unidirectionally oriented to have a fourth orientation direction being parallel to the second orientation direction whereby the fourth orientation direction differs from the third orientation direction by the right angle.

It is preferable that the anti-ferroelectric liquid crystal is isolated into different two types of the first and third areas and of the second and fourth areas which differ by 90 degrees from each other in initial orientation direction toward which an optical axis of anti-ferroelectric liquid crystal molecules is directed under no electric field applied to the anti-ferroelectric liquid crystal immediately after the anti-ferroelectric liquid crystal has been injected into the space between the first and second substrates.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the first polarizing direction corresponds to the first and third orientation directions.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the first polarizing direction corresponds to the second and fourth orientation directions.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the second polarizing direction corresponds to the first and third orientation directions.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the second polarizing direction corresponds to the second and fourth orientation directions.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction in parallel to the first polarizing direction, wherein the first and second polarizing directions correspond to the first and third orientation directions.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction in parallel to the first polarizing direction, wherein the first and second polarizing directions correspond to the second and fourth orientation directions.

It is also preferable that the first and second areas have substantially the same area as each other.

It is also preferable that the first and second areas are uniformly distributed.

The seventh present invention provides a ferroelectric liquid crystal display comprising the following elements. A pair of first and second substrates placed substantially in parallel to each other to form a space between the first and second substrates. A first orientation film is provided which extends over an inner surface of the first substrate so that the first orientation film facing to the space. A second orientation film is provided which extends over an inner surface of the second substrate so that the second orientation film facing to the space. A ferroelectric liquid crystal is provided in the space between the first and second orientation films, wherein the first orientation film is divided into first and second areas in each pixel so that the first area is unidirectionally oriented to have a first orientation direction and the second area is unidirectionally oriented to have a second orientation direction which differs from the first orientation direction by the right angle, and wherein the second orientation film is divided into third and fourth areas in each pixel, and the third area is positioned in correspondence to the first area in a plane view and the fourth area is positioned in correspondence to the second area in the plane view so that the third area is unidirectionally oriented to have a third orientation direction being anti-parallel to the first orientation direction and the fourth area is unidirectionally oriented to have a fourth orientation direction being anti-parallel to the second orientation direction whereby the fourth orientation direction differs from the third orientation direction by the right angle.

It is preferable that the ferroelectric liquid crystal is isolated into different two types of the first and third areas and of the second and fourth areas which differ by 90 degrees from each other in initial orientation direction toward which an optical axis of ferroelectric liquid crystal molecules is directed under no electric field applied to the ferroelectric liquid crystal immediately after the ferroelectric liquid crystal has been injected into the space between the first and second substrates.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the first polarizing direction corresponds to the first and third orientation directions.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the first polarizing direction corresponds to the second and fourth orientation directions.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the second polarizing direction corresponds to the first and third orientation directions.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the second polarizing direction corresponds to the second and fourth orientation directions.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction in parallel to the first polarizing direction, wherein the first and second polarizing directions correspond to the first and third orientation directions.

It is also preferable to fisher provide a first polarizing plate provided on an outer surface of the first substrate and the first polarizing plate having a first polarizing direction, and a second polarizing plate provided on an outer surface of the second substrate and the second polarizing plate having a second polarizing direction in parallel to the first polarizing direction, wherein the first and second polarizing directions correspond to the second and fourth orientation directions.

It is also preferable that the first and second areas have substantially the same area as each other.

It is also preferable that the first and second areas are uniformly distributed.

The eighth present invention provides an anti-ferroelectric liquid crystal display comprising the following elements. A pair of first and second substrates is placed substantially in parallel to each other to form a space between the first and second substrates. A first orientation film is provided which extends over an inner surface of the first substrate so that the first orientation film facing to the space. A second orientation film is provided which extends over an inner surface of the second substrate so that the second orientation film facing to the space. An anti-ferroelectric liquid crystal is provided in the space between the first and second orientation films, wherein the first orientation film is divided into first and second areas in each pixel so that the first area is unidirectionally oriented to have a first orientation direction and the second area is unidirectionally oriented to have a second orientation direction which differs from the first orientation direction by the right angle, and wherein the second orientation film is divided into third and fourth areas in each pixel, and the third area is positioned in correspondence to the first area in a plane view and the fourth area is positioned in correspondence to the second area in the plane view so that the third area is unidirectionally oriented to have a third orientation direction being parallel to the first orientation direction and the fourth area is unidirectionally oriented to have a fourth orientation direction being anti-parallel to the second orientation direction whereby the fourth orientation direction differs from the third orientation direction by the right angle.

It is preferable that the anti-ferroelectric liquid crystal is isolated into different two types of the first and third areas and of the second and fourth areas which differ by 90 degrees from each other in initial orientation direction toward which an optical axis of anti-ferroelectric liquid crystal molecules is directed under no electric field applied to the anti-ferroelectric liquid crystal immediately after the anti-ferroelectric liquid crystal has been injected into the space between the first and second substrates.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the first polarizing direction corresponds to the first and third orientation directions.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the first polarizing direction corresponds to the second and fourth orientation directions.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the second polarizing direction corresponds to the first and third orientation directions.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the second polarizing direction corresponds to the second and fourth orientation directions.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction in parallel to the first polarizing direction, wherein the first and second polarizing directions correspond to the first and third orientation directions.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction in parallel to the first polarizing direction, wherein the first and second polarizing directions correspond to the second and fourth orientation directions.

It is also preferable that the first and second areas have substantially the same area as each other.

It is also preferable that the first and second areas are uniformly distributed.

The ninth present invention provides a ferroelectric liquid crystal display comprising the following elements. A pair of first and second substrates is placed substantially in parallel to each other to form a space between the first and second substrates. A first orientation film is provided which extends over an inner surface of the first substrate so that the first orientation film facing to the space. A second orientation film is provided which extends over an inner surface of the second substrate so that the second orientation film facing to the space. A ferroelectric liquid crystal is provided in the space between the first and second orientation films, wherein entire parts of the first orientation film are unidirectionally oriented to have a first orientation direction and entire parts of the second orientation film are unidirectionally oriented to have a second orientation direction which differs from the first orientation direction by an angle of 90 degrees+2α, where α is an angle by which an optical axis of the ferroelectric liquid crystal differs in a clockwise direction from a unidirectional orientation direction of one of the first and second orientation films when the remaining one of the first and second orientation films is not oriented.

It is preferable that the ferroelectric liquid crystal is isolated into co-existent different two types of local areas which differ by 90 degrees from each other in initial orientation direction toward which an optical axis of ferroelectric liquid crystal molecules is directed under no electric field applied to the ferroelectric liquid crystal immediately after the ferroelectric liquid crystal has been injected into the space between the first and second substrates.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the first polarizing direction corresponds to an initial orientation direction of any one of the co-existent different two types of the local areas.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the second polarizing direction corresponds to an initial orientation direction of any one of the co-existent different two types of the local areas.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction in parallel to the first polarizing direction, wherein the first and second polarizing directions correspond to an initial orientation direction of any one of the co-existent different two types of the local areas.

The tenth present invention provides an anti-ferroelectric liquid crystal display comprising the following elements. A pair of first and second substrates is placed substantially in parallel to each other to form a space between the first and second substrates. A first orientation film is provided extends over an inner surface of the first substrate so that the first orientation film facing to the space. A second orientation film is provided which extends over an inner surface of the second substrate so that the second orientation film facing to the space. An anti-ferroelectric liquid crystal is provided in the space between the first and second orientation films, wherein entire parts of the first orientation film are unidirectionally oriented to have a first orientation direction and entire parts of the second orientation film are unidirectionally oriented to have a second orientation direction which differs from the first orientation direction by an angle of 90 degrees+2α, where α is an angle by which an optical axis of the anti-ferroelectric liquid crystal differs in a clockwise direction from a unidirectional orientation direction of one of the first and second orientation films when the remaining one of the first and second orientation films is not oriented.

It is also preferable that the anti-ferroelectric liquid crystal is isolated into co-existent different two types of local areas which differ by 90 degrees from each other in initial orientation direction toward which an optical axis of anti-ferroelectric liquid crystal molecules is directed under no electric field applied to the anti-ferroelectric liquid crystal immediately after the anti-ferroelectric liquid crystal has been injected into the space between the first and second substrates.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the first polarizing direction corresponds to an initial orientation direction of any one of the co-existent different two types of the local areas.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the second polarizing direction corresponds to an initial orientation direction of any one of the co-existent different two types of the local areas.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction in parallel to the first polarizing direction, wherein the first and second polarizing directions correspond to an initial orientation direction of any one of the co-existent different two types of the local areas.

The eleventh present invention provides a ferroelectric liquid crystal display comprising the following elements. A pair of first and second substrates is placed substantially in parallel to each other to form a space between the first and second substrates. A first orientation film is provided which extends over an inner surface of the first substrate so that the first orientation film facing to the space. A second orientation film is provided which extends over an inner surface of the second substrate so that the second orientation film facing to the space. A ferroelectric liquid crystal is provided in the space between the first and second orientation films, wherein entire parts of the first orientation film are unidirectionally oriented to have a first orientation direction and entire parts of the second orientation film are unidirectionally oriented to have a second orientation direction which differs from the first orientation direction by an angle of 90 degrees−2α, where α is an angle by which an optical axis of the ferroelectric liquid crystal differs in a clockwise direction from a unidirectional orientation direction of one of the first and second orientation films when the remaining one of the first and second orientation films is not oriented.

It is preferable that the ferroelectric liquid crystal is isolated into co-existent different two types of local areas which differ by 90 degrees from each other in initial orientation direction toward which an optical axis of ferroelectric liquid crystal molecules is directed under no electric field applied to the ferroelectric liquid crystal immediately after the ferroelectric liquid crystal has been injected into the space between the first and second substrates.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the first polarizing direction corresponds to an initial orientation direction of any one of the co-existent different two types of the local areas.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the second polarizing direction corresponds to an initial orientation direction of any one of the co-existent different two types of the local areas.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction in parallel to the first polarizing direction, wherein the first and second polarizing directions correspond to an initial orientation direction of any one of the co-existent different two types of the local areas.

The twelfth present invention provides an anti-ferroelectric liquid crystal display comprising the following elements. A pair of first and second substrates is placed substantially in parallel to each other to form a space between the first and second substrates. A first orientation film is provided which extends over an inner surface of the first substrate so that the first orientation film facing to the space. A second orientation film is provided which extends over an inner surface of the second substrate so that the second orientation film facing to the space. An anti-ferroelectric liquid crystal is provided in the space between the first and second orientation films, wherein entire parts of the first orientation film are unidirectionally oriented to have a first orientation direction and entire parts of the second orientation film are unidirectionally oriented to have a second orientation direction which differs from the first orientation direction by an angle of 90 degrees−2α, where α is an angle by which an optical axis of the anti-ferroelectric liquid crystal differs in a clockwise direction from a unidirectional orientation direction of one of the first and second orientation films when the remaining one of the first and second orientation films is not oriented.

It is also preferable that the anti-ferroelectric liquid crystal is isolated into co-existent different two types of local areas which differ by 90 degrees from each other in initial orientation direction toward which an optical axis of anti-ferroelectric liquid crystal molecules is directed under no electric field applied to the anti-ferroelectric liquid crystal immediately after the anti-ferroelectric liquid crystal has been injected into the space between the first and second substrates.

It is also preferable that a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the first polarizing direction corresponds to an initial orientation direction of any one of the co-existent different two types of the local areas.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction vertical to the first polarizing direction, wherein the second polarizing direction corresponds to an initial orientation direction of any one of the co-existent different two types of the local areas.

It is also preferable to further provide a first polarizing plate provided on an outer surface of the first substrate and the first polarizing plate having a first polarizing direction, and a second polarizing plate provided on an outer surface of the second substrate and the second polarizing plate having a second polarizing direction in parallel to the first polarizing direction, wherein the first and second polarizing directions correspond to an initial orientation direction of any one of the co-existent different two types of the local areas.

Differently from the present invention, in the twisted nematic liquid crystal display, the twisted nematic liquid crystal molecules positioned in the enter area and not adjacent to two substrates is risen up from the substrate surface and the longitudinal axis of the twisted nematic liquid crystal molecules is tilted from the substrate surface. There are possible two opposite directions of rising up the twisted nematic liquid crystal molecules. The first one is the right-up direction and the second one is the left-up direction. In order to compensate the remarkable dependency of the transmittance of the ray of light upon view angle, it was proposed to divide the twisted nematic liquid crystal into co-existent different two types of area having different directions toward which the longitudinal axis of the twisted nematic liquid crystal molecules are tilted up. For this purpose, the substrates are subjected to orientation treatments so that the orientation directions are different by 180 degrees between the co-existent different two types of area.

In contrast, the longitudinal axis of the ferroelectric or anti-ferroelectric liquid crystal rotates around the normal of the substrate surface and the ends of the ferroelectric or anti-ferroelectric liquid crystal rotate in a plane parallel to the substrate surface so that the locus of the longitudinal axis on rotation draws two cones which tops faces to each other. Even if the substrates are subjected to orientation treatments so as to divide the ferroelectric or anti-ferroelectric liquid crystal into co-existent different two types of area having different directions toward which the longitudinal axis of the twisted nematic liquid crystal molecules are tilted up, the transmittance of the ray of light through the liquid crystal is the same between the co-existent different two types of area. This means it is difficult to compensate the dependency of the transmittance of the ray of light upon the view angle.

As described above, in accordance with the first, third, fifth, seventh, ninth and eleventh present inventions, however, two substrates are subjected to orientation treatments so that the two substrates differ in orientation direction from each other by the right angle or 90 degrees so as to divide the ferroelectric liquid crystal into co-existent different two types of local areas having different initial orientation directions by 90 degrees from each other toward which the optical axis of the ferroelectric liquid crystal molecules are tilted up, provided that the transmittance of the ray of light through the liquid crystal is the same between the co-existent different two types of area. This means it is possible to compensate the uniaxial anisotropy of the transmittance dependency of the ray of light upon the view angle for the following reasons.

The ferroelectric liquid crystal is injected into a liquid crystal cell having orientation films of a unidirectional orientation. Optical axis of the ferroelectric liquid crystal immediately after injected into the liquid crystal cell under no voltage application is directed to correspond to the unidirectional orientation of the orientation films. The direction of the optical axis of the ferroelectric liquid crystal immediately after injected into the liquid crystal cell under no voltage application will hereinafter be referred to as an initial orientation direction.

Figure 7:
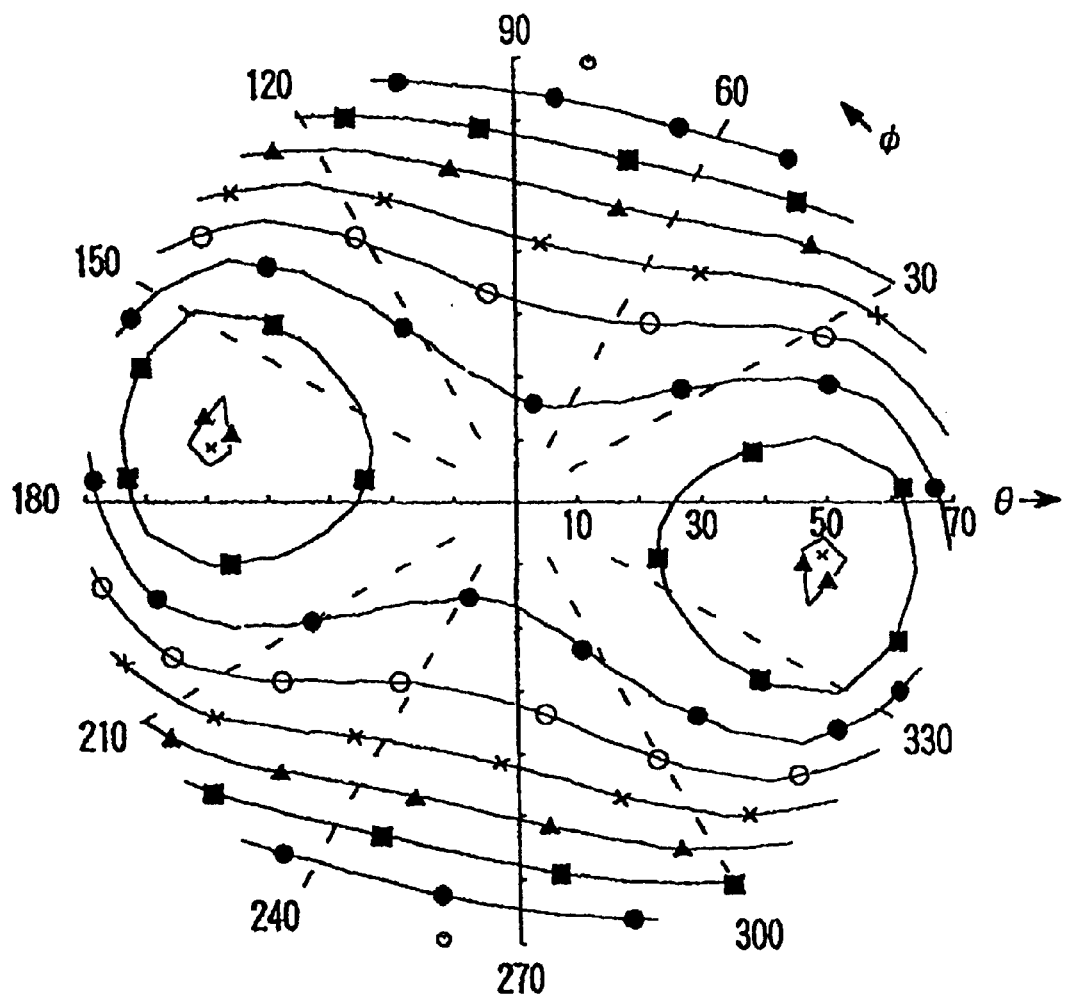
FIG. 7 is a diagram illustrative of equitransmittance curves of the ray of light through a ferroelectric liquid crystal to evaluate a dependency of transmittance of the ray of light upon a view angle when the optical axis of the ferroelectric liquid crystal is made rotate by 25 degrees from the direction defined by the azimuth angles of 0 degree and 180 degrees around the normal to the substrate surface and in a plane parallel to the substrate surface.

The initial orientation direction of the ferroelectric liquid crystal molecules is made to correspond to the direction defined by the azimuth angles of 0 degree and 180 degrees. FIG. 7 is a diagram illustrative of equitransmittance curves of the ray of light through a ferroelectric liquid crystal to evaluate a dependency of transmittance of the ray of light upon a view angle when the optical axis of the ferroelectric liquid crystal is made to rotate by 25 degrees from the direction defined by the azimuth angles of 0 degree and 180 degrees around the normal to the substrate surface and in a plane parallel to the substrate surface. The wavelength of light for measurement is 550 nanometers. The transmittance of the ray of light is zero when no ferroelectric liquid crystal is inserted and in place two polarizing plates are provided so that polarization directions of the two polarizing plates are made cross at the right angle. The transmittance of the ray of light is 1 when no ferroelectric liquid crystal is inserted and in place two polarizing plates are provided so that polarization directions of the two polarizing plates are made parallel to each other. The equitransmittance curves of the ray of light through a ferroelectric liquid crystal in FIG. 7 indicates that as the view angle at which the observer observes the display screen approaches a direction defined by the azimuth angles of 80 degrees and 260 degrees, the distances of the equitransmittance curves are made narrow. This means that as the view angle, at which the observer observes the display screen, approaches a direction defined by the azimuth angles of 80 degrees and 260 degrees, the variation in transmittance of the ray of light through the ferroelectric liquid crystal is relatively rapid. As the view angle approaches a direction defined by the azimuth angles of −10 degrees and 170 degrees, the distances of the equitransmittance curves are made wide. This means that as the view angle approaches a direction defined by the azimuth angles of −10 degrees and 170 degrees, the variation in transmittance of the ray of light through the ferroelectric liquid crystal is relatively gentle. There are two directions in which the variation in transmittance of the ray of light through the ferroelectric liquid crystal is relatively rapid and relatively gentle. The ferroelectric liquid crystal has the uniaxial anisotropy of the view angle dependency such that the rate of variation in transmittance of the ray of light through the ferroelectric liquid crystal depends upon the azimuth angle.

Figure 8:
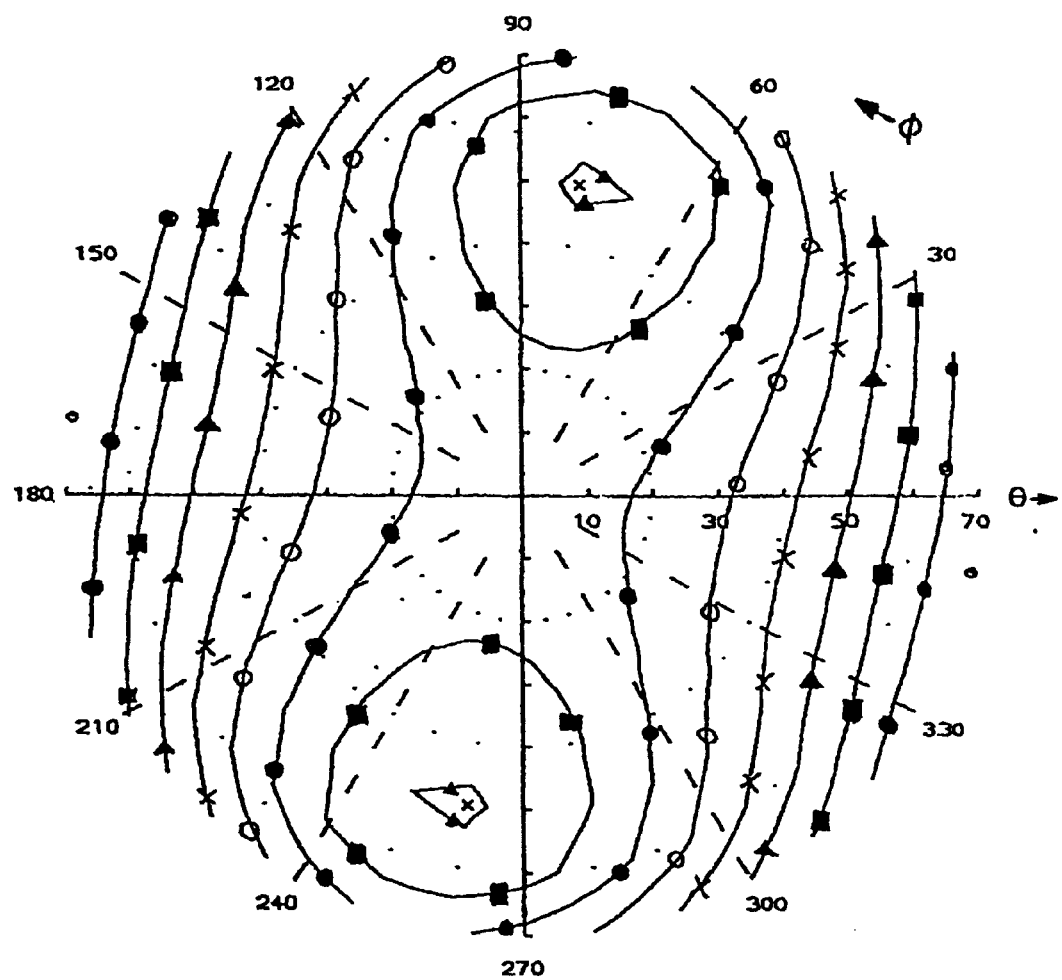
FIG. 8 is a diagram illustrative of equitransmittance curves of the ray of light through a ferroelectric liquid crystal to evaluate a dependency of transmittance of the ray of light upon a view angle when the optical axis of the ferroelectric liquid crystal is made rotate by 25 degrees from the direction defined by the azimuth angles of 90 degrees and 270 degrees around the normal to the substrate surface and in a plane parallel to the substrate surface.
Figure 11:
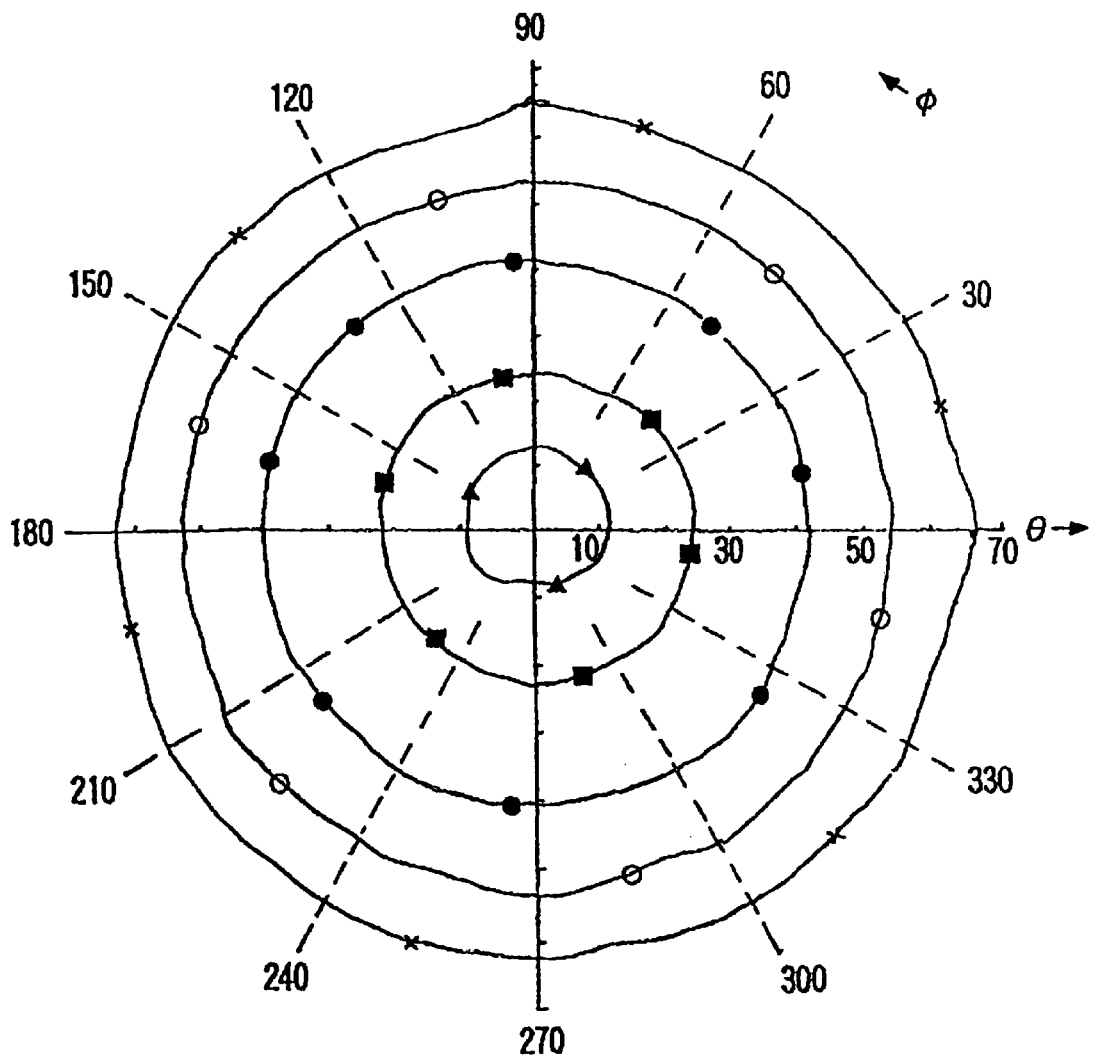
FIG. 11 is a diagram illustrative of equitransmittance curves of the ray of light through a ferroelectric liquid crystal to evaluate a dependency of transmittance of the ray of light upon a view angle when both the optical properties differing by 90 degrees from each other on the transmittance of the ray of light though the ferroelectric liquid crystal are superimposed.

The initial orientation direction of the ferroelectric liquid crystal molecules is made correspond to the direction defined by the azimuth angles of 90 degrees and 270 degrees. FIG. 8 is a diagram illustrative of equitransmittance curves of the ray of light through a ferroelectric liquid crystal to evaluate a dependency of transmittance of the ray of light upon a view angle when the optical axis of the ferroelectric liquid crystal is made rotate by 25 degrees from the direction defined by the azimuth angles of 90 degrees and 270 degrees around the normal to the substrate surface and in a plane parallel to the substrate surface. FIG. 11 is a diagram illustrative of equitransmittance curves of the ray of light through a ferroelectric liquid crystal to evaluate a dependency of transmittance of the ray of light upon a view angle when both the optical properties differing by 90 degrees from each other on the transmittance of the ray of light though the ferroelectric liquid crystal are superimposed. The wavelength of light for measurement is 550 nanometers. The transmittance of the ray of light is zero when no ferroelectric liquid crystal is inserted and in place two polarizing plates are provided so that polarization directions of the two polarizing plates are made cross at the right angle. The transmittance of the ray of light is 1 when no ferroelectric liquid crystal is inserted and in place two polarizing plates are provided so that polarization directions of the two polarizing plates are made parallel to each other. The equitransmittance curves of the ray of light through a ferroelectric liquid crystal in FIG. 8 indicates that as the view angle at which the observer observes the display screen approaches a direction defined by the azimuth angles of −10 degrees and 170 degrees, the distances of the equitransmittance curves are made narrow.

This means that as the view angle, at which the observer observes the display screen, approaches a direction defined by the azimuth angles of −10 degrees and 170 degrees, the variation in transmittance of the ray of light through the ferroelectric liquid crystal is relatively rapid. As the view angle approaches a direction defined by the azimuth angles of 80 degrees and 260 degrees, the distances of the equitransmittance curves are made wide. This means that as the view angle approaches a direction defined by the azimuth angles of 80 degrees and 260 degrees, the variation in transmittance of the ray of light through the ferroelectric liquid crystal is relatively gentle.

There are two directions in which the variation in transmittance of the ray of light through the ferroelectric liquid crystal is relatively rapid and relatively gentle. The ferroelectric liquid crystal has the uniaxial anisotropy of the view angle dependency such that the rate of variation in transmittance of the ray of light through the ferroelectric liquid crystal depends upon the azimuth angle. The uniaxial anisotropy of the view angle dependency of the ferroelectric liquid crystal illustrated in FIG. 8 differs by the azimuth angle of 90 degrees from the uniaxial anisotropy of the view angle dependency of the ferroelectric liquid crystal illustrated in FIG. 7.

If both the optical properties on the transmittance of the ray of light though the ferroelectric liquid crystal illustrated in FIGS. 7 and 8 are superimposed, then the unidirectional anisotropy of the view angle dependency of the ferroelectric liquid crystal is relaxed thereby to obtain an isotropy of the view angle dependency of the ferroelectric liquid crystal wherein the equitransmittance curves has almost the circular shape as illustrated in FIG. 11. This means that of the ferroelectric liquid crystal molecules the two different areas having initial orientation directions differing by 90 degrees from each other can relax the individual unidirectional anisotropy of the view angle dependency so as to provide the isotropy of the view angle dependency wherein the equitransmittance curves has almost the circular shape. Namely, the provision of the above two different areas of the ferroelectric liquid crystal molecules having initial orientation directions differing by 90 degrees from each other changes the index ellipsoid into the circular of the evaluation point of the liquid crystal cell whereby the dependency of the transmittance of the ray of light upon the view angle is reduced.

The above description of the reason why the co-existent two different areas of the ferroelectric liquid crystal molecules having initial orientation directions differing by 90 degrees from each other can reduce the dependency of the transmittance of the ray of light upon the view angle would be applicable to the anti-ferroelectric liquid crystal.

The above structural feature of the provision of the above two different areas of the ferroelectric liquid crystal molecules differing in initial orientation directions by 90 degrees from each other not only reduces the dependency of the transmittance of the ray of light upon the view angle but also prevents the flicker for the following reasons.

Figure 9:
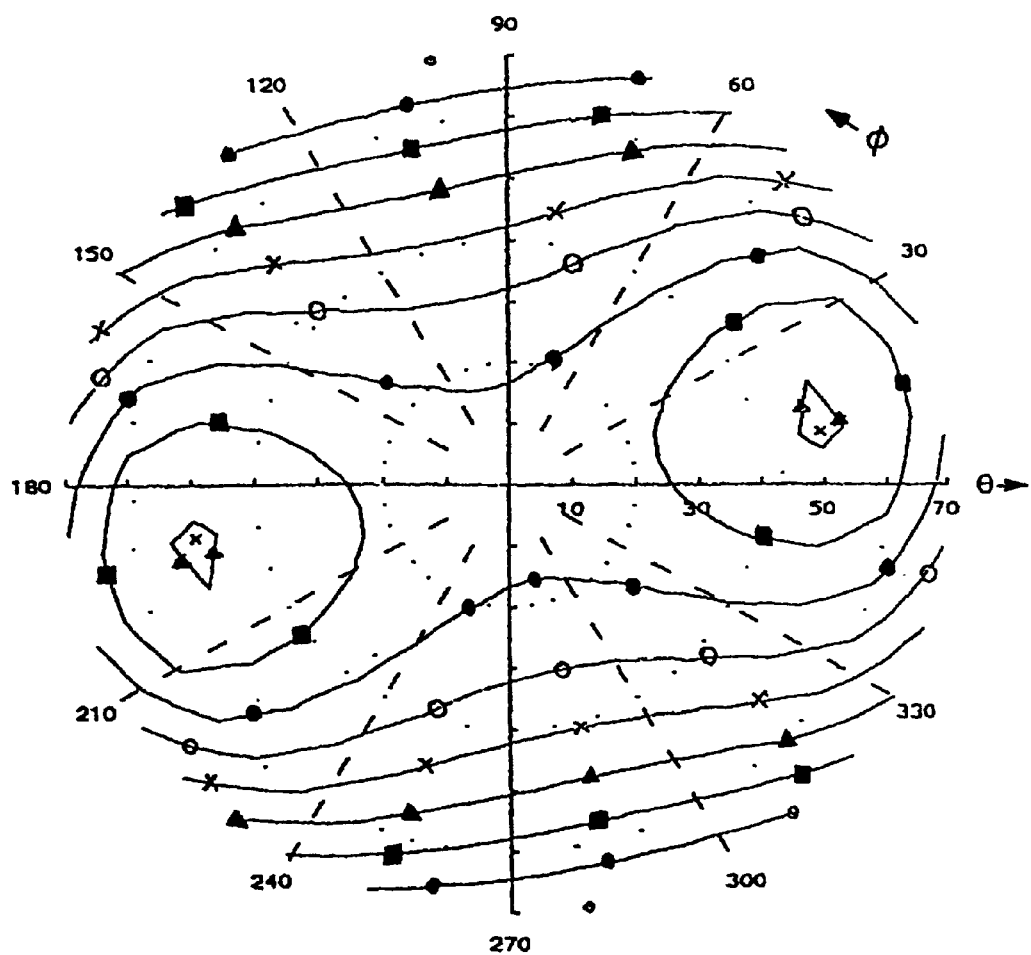
FIG. 9 is a diagram illustrative of equitransmittance curves of the ray of light through a ferroelectric liquid crystal to evaluate a dependency of transmittance of the ray of light upon a view angle when the optical axis of the ferroelectric liquid crystal is made rotate by −25 degrees from the direction defined by the azimuth angles of 0 degree and 180 degrees around the normal to the substrate surface and in a plane parallel to the substrate surface.

The initial orientation direction of the ferroelectric liquid crystal molecules is made correspond to the direction defined by the azimuth angles of 0 degree and 180 degrees. FIG. 9 is a diagram illustrative of equitransmittance curves of the ray of light through a ferroelectric liquid crystal to evaluate a dependency of transmittance of the ray of light upon a view angle when the optical axis of the ferroelectric liquid crystal is made rotate by −25 degrees from the direction defined by the azimuth angles of 0 degree and 180 degrees around the normal to the substrate surface and in a plane parallel to the substrate surface. The wavelength of light for measurement is 550 nanometers. The transmittance of the ray of light is zero when no ferroelectric liquid crystal is inserted and in place two polarizing plates are provided so that polarization directions of the two polarizing plates are made cross at the right angle. The transmittance of the ray of light is 1 when no ferroelectric liquid crystal is inserted and in place two polarizing plates are provided so that polarization directions of the two polarizing plates are made parallel to each other. The equitransmittance curves of the ray of light through a ferroelectric liquid crystal in FIG. 9 indicates that as the view angle at which the observer observes the display screen approaches a direction defined by the azimuth angles of 100 degrees and 280 degrees, the distances of the equitransmittance curves are made narrow. This means that as the view angle, at which the observer observes the display screen, approaches a direction defined by the azimuth angles of 100 degrees and 280 degrees, the variation in transmittance of the ray of light through the ferroelectric liquid crystal is relatively rapid. As the view angle approaches a direction defined by the azimuth angles of 10 degrees and 190 degrees, the distances of the equitransmittance curves are made wide. This means that as the view angle approaches a direction defined by the azimuth angles of 10 degrees and 190 degrees, the variation in transmittance of the ray of light through the ferroelectric liquid crystal is relatively gentle. There are two directions in which the variation in transmittance of the ray of light through the ferroelectric liquid crystal is relatively rapid and relatively gentle. The ferroelectric liquid crystal has the uniaxial anisotropy of the view angle dependency such that the rate of variation in transmittance of the ray of light through the ferroelectric liquid crystal depends upon the azimuth angle.

Figure 10:
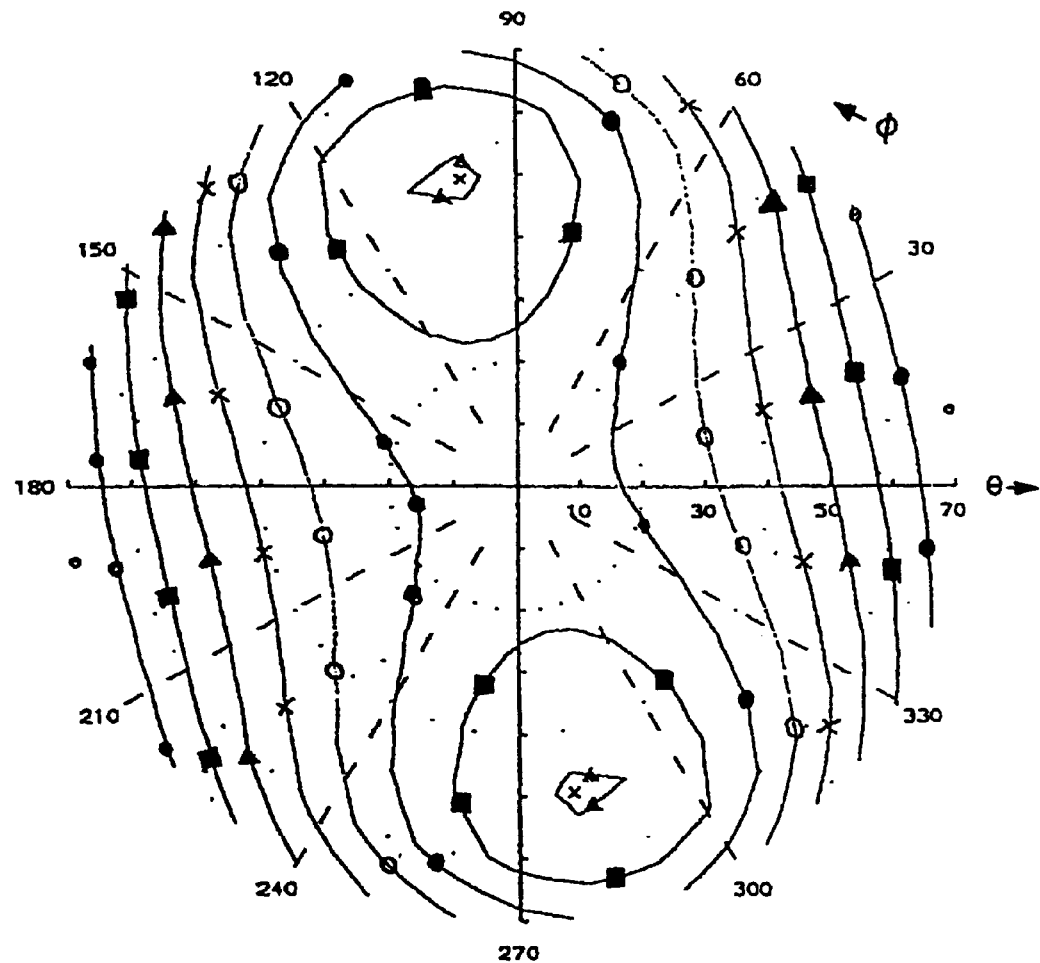
FIG. 10 is a diagram illustrative of equitransmittance curves of the ray of light through a ferroelectric liquid crystal to evaluate a dependency of transmittance of the ray of light upon a view angle when the optical axis of the ferroelectric liquid crystal is made rotate by −25 degrees from the direction defined by the azimuth angles of 90 degrees and 270 degrees around the normal to the substrate surface and in a plane parallel to the substrate surface.

The initial orientation direction of the ferroelectric liquid crystal molecules is made correspond to the direction defined by the azimuth angles of 90 degrees and 270 degrees. FIG. 10 is a diagram illustrative of equitransmittance curves of the ray of light through a ferroelectric liquid crystal to evaluate a dependency of transmittance of the ray of light upon a view angle when the optical axis of the ferroelectric liquid crystal is made rotate by −25 degrees from the direction defined by the azimuth angles of 90 degrees and 270 degrees around the normal to the substrate surface and in a plane parallel to the substrate surface. FIG. 11 is a diagram illustrative of equitransmittance curves of the ray of light through a ferroelectric liquid crystal to evaluate a dependency of transmittance of the ray of light upon a view angle when both the optical properties differing by 90 degrees from each other on the transmittance of the ray of light though the ferroelectric liquid crystal are superimposed. The wavelength of light for measurement is 550 nanometers. The transmittance of the ray of light is zero when no ferroelectric liquid crystal is: inserted and in place two polarizing plates are provided so that polarization directions of the two polarizing plates are made cross at the right angle. The transmittance of the ray of light is 1 when no ferroelectric liquid crystal is inserted and in place two polarizing plates are provided so that polarization directions of the two polarizing plates are made parallel to each other. The equitransmittance curves of the ray of light through a ferroelectric liquid crystal in FIG. 8 indicates that as the view angle at which the observer observes the display screen approaches a direction defined by the azimuth angles of 10 degrees and 190 degrees, the distances of the equitransmittance curves are made narrow.

This means that as the view angle, at which the observer observes the display screen, approaches a direction defined by the azimuth angles of 10 degrees and 190 degrees, the variation in transmittance of the ray of light through the ferroelectric liquid crystal is relatively rapid. As the view angle approaches a direction defined by the azimuth angles of 100 degrees and 280 degrees, the distances of the equitransmittance curves are made wide. This means that as the view angle approaches a direction defined by the azimuth angles of 100 degrees and 280 degrees, the variation in transmittance of the ray of light through the ferroelectric liquid crystal is relatively gentle. There are two directions in which the variation in transmittance of the ray of light through the ferroelectric liquid crystal is relatively rapid and relatively gentle. The ferroelectric liquid crystal has the uniaxial anisotropy of the view angle dependency such that the rate of variation in transmittance of the ray of light through the ferroelectric liquid crystal depends upon the azimuth angle. The uniaxial anisotropy of the view angle dependency of the ferroelectric liquid crystal illustrated in FIG. 8 differs by the azimuth angle of 90 degrees from the uniaxial anisotropy of the view angle dependency of the ferroelectric liquid crystal illustrated in FIG. 9. If both the optical properties on the transmittance of the ray of light though the ferroelectric liquid crystal illustrated in FIGS. 9 and 10 are superimposed, then the unidirectional anisotropy of the view angle dependency of the ferroelectric liquid crystal is relaxed thereby to obtain an isotropy of the view angle dependency of the ferroelectric liquid crystal wherein the equitransmittance curves has almost the circular shape as illustrated in FIG. 11. The difference in polarity of the applied voltage correspond to the difference in direction of the above rotation of the optical axis of the ferroelectric liquid crystal molecules. This means that of the ferroelectric liquid crystal molecules the two different areas having initial orientation directions differing by 90 degrees from each other can make the optical transmittance properties remain unchanged over opposite polarities of the applied voltage. This farther means even if the observer observes the screen in the oblique direction, no problem with flicker is raised.

The above description of the reason why the co-existent two different areas of the ferroelectric liquid crystal molecules having initial orientation directions differing by 90 degrees from each other can prevent the flicker would be applicable to the anti-ferroelectric liquid crystal.

Accordingly, it is apparent from the above descriptions that the coexistent two different areas of the ferroelectric liquid crystal molecules having initial orientation directions differing by 90 degrees from each other not only can reduce the dependency of the transmittance of the ray of light upon the view angle but also prevents the flicker.

In accordance with the present invention, the ferroelectric liquid crystal is inserted between the two substrates having uniaxial orientations differing by the right angle from each other. If the orientation processes for the substrates is not uniform, then the ferroelectric liquid crystal is partially oriented in one uniaxial orientation of first one of the substrates and partially oriented in the opposite uniaxial orientation of second one of the substrates. This means that the two different types of fine areas of the ferroelectric liquid crystal co-exist in each pixel.

The following descriptions will focus on a black display performance. If, contrary to the present invention, the angle between the two orientation directions of the two substrates is different from 90 degrees, it is apparent from the above descriptions that the co-existent two different types of areas of the ferroelectric liquid crystal molecules having initial orientation directions differing by an angle but not 90 degrees from each other not only can not reduce sufficiently the uniaxial anisotropy of the light transmittance dependency upon the view angle but also can not prevent sufficiently the flicker.

Further if, contrary to the present invention, the above co-existent two different types of areas of the ferroelectric liquid crystal having initial orientation directions differing by an angle of not 90 degrees from each other is placed between two polarizing plates having polarizing axes differing by the right angle from each other, then the above co-existent two different types of areas of the ferroelectric liquid crystal differ from each other in the included angles: defined by the optical axis of the ferroelectric liquid crystal and the polarizing axis of the polarizing plate, whereby it is difficult to obtain the desired exact black display.

If, however, in accordance with the present invention, the above coexistent two different types of areas of the ferroelectric liquid crystal having initial orientation directions differing by the right angle from each other is placed between two polarizing plates having polarizing axes differing by the right angle from each other, then the above co-existent two different types of areas of the ferroelectric liquid crystal are the same as each other in the light of the included angle defined by the optical axis of the ferroelectric liquid crystal and the polarizing axis of the polarizing plate, whereby it is possible to obtain the desired exact black display. Further, it is possible to prevent the flicker when alternating current driving of the display is carried out and the observer views the screen in an oblique direction.

As described above, the second, fourth, sixth, eighth, tenth and twelfth present inventions are respectively different from the first, third, fifth, seventh, ninth and eleventh present inventions only in the liquid crystal is anti-ferroelectric liquid crystal in place of the ferroelectric liquid crystal. The above descriptions for the first, third, fifth, seventh, ninth and eleventh present inventions are commonly applicable to the second, fourth, sixth, eighth, tenth and twelfth present inventions.

Namely, in accordance with the second, fourth, sixth, eighth, tenth and twelfth present inventions, however, two substrates are subjected to orientation treatments so that the two substrates differ in orientation direction from each other by the right angle or 90 degrees so as to divide the anti-ferroelectric liquid crystal into co-existent different two types of local areas having different initial orientation directions by 90 degrees from each other toward which the optical axis of the anti-ferroelectric liquid crystal molecules are tilted up, provided that the transmittance of the ray of light through the liquid crystal is the same between the co-existent different two types of area. This means it possible to compensate the uniaxial anisotropy of the transmittance dependency of the ray of light upon the view angle for the following reasons.

The anti-ferroelectric liquid crystal is injected into a liquid crystal cell having orientation films of a unidirectional orientation. Optical axis of the anti-ferroelectric liquid crystal immediately after injected into the liquid crystal cell under no voltage application is directed to correspond to the unidirectional orientation of the orientation films. The direction of the optical axis of the anti-ferroelectric liquid crystal immediately after injected into the liquid crystal cell under no voltage application will hereinafter be referred to as an initial orientation direction.

The initial orientation direction of the anti-ferroelectric liquid crystal molecules is made correspond to the direction defined by the azimuth angles of 0 degree and 180 degrees. FIG. 7 is a diagram illustrative of equitransmittance curves of the ray of light through a anti-ferroelectric liquid crystal to evaluate a dependency of transmittance of the ray of light upon a view angle when the optical axis of the anti-ferroelectric liquid crystal is made rotate by 25 degrees from the direction defined by the azimuth angles of 0 degree and 180 degrees around the normal to the substrate surface and in a plane parallel to the substrate surface. The wavelength of light for measurement is 550 nanometers. The transmittance of the ray of light is zero when no anti-ferroelectric liquid crystal is inserted and in place two polarizing plates are provided so that polarization directions of the two polarizing plates are made cross at the right angle. The transmittance of the ray of light is 1 when no anti-ferroelectric liquid crystal is inserted and in place two polarizing plates are provided so that polarization directions of the two polarizing plates are made parallel to each other. The equitransmittance curves of the ray of light through a anti-ferroelectric liquid crystal in FIG. 7 indicates that as the view angle at which the observer observes the display screen approaches a direction defined by the azimuth angles of 80 degrees and 260 degrees, the distances of the equitransmittance curves are made narrow. This means that as the view angle, at which the observer observes the display screen, approaches a direction defined by the azimuth angles of 80 degrees and 260 degrees, the variation in transmittance of the ray of light through the anti-ferroelectric liquid crystal is relatively rapid. As the view angle approaches a direction defined by the azimuth angles of –10 degrees and 170 degrees, the distances of the equitransmittance curves are made wide. This means that as the view angle approaches a direction defined by the azimuth angles of –10 degrees and 170 degrees, the variation in transmittance of the ray of light through the anti-ferroelectric liquid crystal is relatively gentle. There are two directions in which the variation in transmittance of the ray of light through the anti-ferroelectric liquid crystal is relatively rapid and relatively gentle. The anti-ferroelectric liquid crystal has the uniaxial anisotropy of the view angle dependency such that the rate of variation in transmittance of the ray of light through the anti-ferroelectric liquid crystal depends upon the azimuth angle.

The initial orientation direction of the anti-ferroelectric liquid crystal molecules is made, correspond to the direction defined by the azimuth angles of 90 degrees and 270 degrees. FIG. 8 is a diagram illustrative of equitransmittance curves of the ray of light through a anti-ferroelectric liquid crystal to evaluate a dependency of transmittance of the ray of light upon a view angle when the optical axis of the anti-ferroelectric liquid crystal is made rotate by 25 degrees from the direction defined by the azimuth angles of 90 degrees and 270 degrees around the normal to the substrate surface and in a plane parallel to the substrate surface. FIG. 11 is a diagram illustrative of equitransmittance curves of the ray of light through a anti-ferroelectric liquid crystal to evaluate a dependency of transmittance of the ray of light upon a view angle when both the optical properties differing by 90 degrees from each other on the transmittance of the ray of light though the anti-ferroelectric liquid crystal are superimposed. The wavelength of light for measurement is 550 nanometers. The transmittance of the ray of light is zero when no anti-ferroelectric liquid crystal is inserted and in place two polarizing plates are provided so that polarization directions of the two polarizing plates are made cross at the right angle. The transmittance of the ray of light is 1 when no anti-ferroelectric liquid crystal is inserted and in place two polarizing plates are provided so that polarization directions of the two polarizing plates are made parallel to each other. The equitransmittance curves of the ray of light through a anti-ferroelectric liquid crystal in FIG. 8 indicates that as the view angle at which the observer observes the display screen approaches a direction defined by the azimuth angles of –10 degrees and 170 degrees, the distances of the equitransmittance curves are made narrow. This means that as the view angle, at which the observer observes the display screen, approaches a direction defined by the azimuth angles of –10 degrees and 170 degrees, the variation in transmittance of the ray of light through the anti-ferroelectric liquid crystal is relatively rapid. As the view angle approaches a direction defined by the azimuth angles of 80 degrees and 260 degrees, the distances of the equitransmittance curves are made wide. This means that as the view angle approaches a direction defined by the azimuth angles of 80 degrees and 260 degrees, the variation in transmittance of the ray of light through the anti-ferroelectric liquid crystal is relatively gentle. There are two directions in which the variation in transmittance of the ray of light through the anti-ferroelectric liquid crystal is relatively rapid and relatively gentle. The anti-ferroelectric liquid crystal has the uniaxial anisotropy of the view angle dependency such that the rate of variation in transmittance of the ray of light through the anti-ferroelectric liquid crystal depends upon the azimuth angle. The uniaxial anisotropy of the view angle dependency of the anti-ferroelectric liquid crystal illustrated in FIG. 8 differs by the azimuth angle of 90 degrees from the uniaxial anisotropy of the view angle dependency of the anti-ferroelectric liquid crystal illustrated in FIG. 7. If both the optical properties on the transmittance of the ray of light though the anti-ferroelectric liquid crystal illustrated in FIGS. 7 and 8 are superimposed, then the unidirectional anisotropy of the view angle dependency of the anti-ferroelectric liquid crystal is relaxed thereby to obtain an isotropy of the view angle dependency of the anti-ferroelectric liquid crystal wherein the equitransmittance curves has almost the circular shape as illustrated in FIG. 11. This manes that of the anti-ferroelectric liquid crystal molecules the two different areas having initial orientation directions differing by 90 degrees from each other can relax the individual unidirectional anisotropy of the view angle dependency so as to provide the isotropy of the view angle dependency wherein the equitransmittance curves has almost the circular shape. Namely, the provision of the above two different areas of the anti-ferroelectric liquid crystal molecules having initial orientation directions differing by 90 degrees from each other changes the index ellipsoid into the circular of the evaluation point of the liquid crystal cell whereby the dependency of the transmittance of the ray of light upon the view angle is reduced.

The above description of the reason why the co-existent two different areas of the anti-ferroelectric liquid crystal molecules having initial orientation directions differing by 90 degrees from each other can reduce the dependency of the transmittance of the ray of light upon the view angle would be applicable to the anti-anti-ferroelectric liquid crystal.

The above structural feature of the provision of the above two different areas of the anti-ferroelectric liquid crystal molecules differing in initial orientation directions by 90 degrees from each other not only reduces the dependency of the transmittance of the ray of light upon the view angle but also prevents the flicker for the following reasons.

The initial orientation direction of the anti-ferroelectric liquid crystal molecules is made correspond to the direction defined by the azimuth angles of 0 degree and 180 degrees. FIG. 9 is a diagram illustrative of equitransmittance curves of the ray of light through a anti-ferroelectric liquid crystal to evaluate a dependency of transmittance of the ray of light upon a view angle when the optical axis of the anti-ferroelectric liquid crystal is made rotate by −25 degrees from the direction defined by the azimuth angles of 0 degree and 180 degrees around the normal to the substrate surface and in a plane parallel to the substrate surface. The wavelength of light for measurement is 550 nanometers. The transmittance of the ray of light is zero when no anti-ferroelectric liquid crystal is inserted and in place two polarizing plates are provided so that polarization directions of the two polarizing plates are made cross at the right angle. The transmittance of the ray of light is 1 when no anti-ferroelectric liquid crystal is inserted and in place two polarizing plates are provided so that polarization directions of the two polarizing plates are made parallel to each other. The equitransmittance curves of the ray of light through a anti-ferroelectric liquid crystal in FIG. 9 indicates that as the view angle at which the observer observes the display screen approaches a direction defined by the azimuth angles of 100 degrees and 280 degrees, the distances of the equitransmittance curves are made narrow. This means that as the view angle, at which the observer observes the display screen, approaches a direction defined by the azimuth angles of 100 degrees and 280 degrees, the variation in transmittance of the ray of light through the anti-ferroelectric liquid crystal is relatively rapid. As the view angle approaches a direction defined by the azimuth angles of 10 degrees and 190 degrees, the distances of the equitransmittance curves are made wide. This means that as the view angle approaches a direction defined by the azimuth angles of 10 degrees and 190 degrees, the variation in transmittance of the ray of light through the anti-ferroelectric liquid crystal is relatively gentle. There are two directions in which the variation in transmittance of the ray of light through the anti-ferroelectric liquid crystal is relatively rapid and relatively gentle. The anti-ferroelectric liquid crystal has the uniaxial anisotropy of the view angle dependency such that the rate of variation in transmittance of the ray of light through the anti-ferroelectric liquid crystal depends upon the azimuth angle.

The initial orientation direction of the anti-ferroelectric liquid crystal molecules is made correspond to the direction defined by the azimuth angles of 90 degrees and 270 degrees. FIG. 10 is a diagram illustrative of equitransmittance curves of the ray of light through a anti-ferroelectric liquid crystal to evaluate a dependency of transmittance of the ray of light upon a view angle when the optical axis of the anti-ferroelectric liquid crystal is made rotate by −25 degrees from the direction defined by the azimuth angles of 90 degrees and 270 degrees around the normal to the substrate surface and in a plane parallel to the substrate surface. FIG. 11 is a diagram illustrative of equitransmittance curves of the ray of light through a anti-ferroelectric liquid crystal to evaluate a dependency of transmittance of the ray of light upon a view angle when both the optical properties differing by 90 degrees from each other on the transmittance of the ray of light though the anti-ferroelectric liquid crystal are superimposed. The wavelength of light for measurement is 550 nanometers. The transmittance of the ray of light is zero when no anti-ferroelectric liquid crystal is inserted and in place two polarizing plates are provided so that polarization directions of the two polarizing plates are made cross at the right angle. The transmittance of the ray of light is 1 when no anti-ferroelectric liquid crystal is inserted and in place two polarizing plates are provided so that polarization directions of the two polarizing plates are made parallel to each other. The equitransmittance curves of the ray of light through a anti-ferroelectric liquid crystal in FIG. 8 indicates that as the view angle at which the observer observes the display screen approaches a direction defined by the azimuth angles of 10 degrees and 190 degrees, the distances of the equitransmittance curves are made narrow. This means that as the view angle, at which the observer observes the display screen, approaches a direction defined by the azimuth angles of 10 degrees and 190 degrees, the variation in transmittance of the ray of light through the anti-ferroelectric liquid crystal is relatively rapid. As the view angle approaches a direction defined by the azimuth angles of 100 degrees and 280 degrees, the distances of the equitransmittance curves are made wide. This means that as the view angle approaches a direction defined by the azimuth angles of 100 degrees and 280 degrees, the variation in transmittance of the ray of light through the anti-ferroelectric liquid crystal is relatively gentle. There are two directions in which the variation in transmittance of the ray of light through the anti-ferroelectric liquid crystal is relatively rapid and relatively gentle. The anti-ferroelectric liquid crystal has the uniaxial anisotropy of the view angle dependency such that the rate of variation in transmittance of the ray of light through the anti-ferroelectric liquid crystal depends upon the azimuth angle. The uniaxial anisotropy of the view angle dependency of the anti-ferroelectric liquid crystal illustrated in FIG. 8 differs by the azimuth angle of 90 degrees from the uniaxial anisotropy of the view angle dependency of the anti-ferroelectric liquid crystal illustrated in FIG. 9.

If both the optical properties on the transmittance of the ray of light though the anti-ferroelectric liquid crystal illustrated in FIGS. 9 and 10 are superimposed, then the unidirectional anisotropy of the view angle dependency of the anti-ferroelectric liquid crystal is relaxed thereby to obtain an isotropy of the view angle dependency of the anti-ferroelectric liquid crystal wherein the equitransmittance curves has almost the circular shape as illustrated in FIG. 11. The difference in polarity of the applied voltage correspond to the difference in direction of the above rotation of the optical axis of the anti-ferroelectric liquid crystal molecules. This means that of the anti-ferroelectric liquid crystal molecules the two different areas having initial orientation directions differing by 90 degrees from each other can make the optical transmittance properties remain unchanged over opposite polarities of the applied voltage. This further means even if the observer observes the screen in the oblique direction, no problem with flicker is raised.

The above description of the reason why the co-existent two different areas of the anti ferroelectric liquid crystal molecules having initial orientation directions differing by 90 degrees from each other can prevent the flicker would be applicable to the anti-anti-ferroelectric liquid crystal.

Accordingly, it is apparent from the above descriptions that the coexistent two different areas of the anti-ferroelectric liquid crystal molecules having initial orientation directions differing by 90 degrees from each other not only can reduce the dependency of the transmittance of the ray of light upon the view angle but also prevents the flicker.

In accordance with the present invention, the anti-ferroelectric liquid crystal is inserted between the two substrates having uniaxial orientations differing by the right angle from each other. If the orientation processes for the substrates is not uniform, then the anti-ferroelectric liquid crystal is partially oriented in one uniaxial orientation of first one of the substrates and partially oriented in the opposite uniaxial orientation of second one of the substrates. This means that the two different types of fine areas of the anti-ferroelectric liquid crystal co-exist in each pixel.

The following descriptions will focus on a black display performance. If, contrary to the present invention, the angle between the two orientation directions of the two substrates is different from 90 degrees, it is apparent from the above descriptions that the co-existent two different types of areas of the anti-ferroelectric liquid crystal molecules having initial orientation directions differing by an angle but not 90 degrees from each other not only can not reduce sufficiently the uniaxial anisotropy of the light transmittance dependency upon the view angle but also can not prevent sufficiently the flicker.

Further if, contrary to the present invention, the above co-existent two different types of areas of the anti-ferroelectric liquid crystal having initial orientation directions differing by an angle of not 90 degrees from each other is placed between two polarizing plates having polarizing axes differing by the right angle from each other, then the above co-existent two different types of areas of the anti-ferroelectric liquid crystal differ from each other in the included tangles defined by the optical axis of the anti-ferroelectric liquid crystal and the polarizing axis of the polarizing plate, whereby it is difficult to obtain the desired exact black display.

If, however, in accordance with the present invention, the above coexistent two different types of areas of the anti-ferroelectric liquid crystal having initial orientation directions differing by the right angle from each other is placed between two polarizing plates having polarizing axes differing by the right angle from each other, then the above co-existent two different types of areas of the anti-ferroelectric liquid crystal are the same as each other in the light of the included angle defined by the optical axis of the anti-ferroelectric liquid crystal and the polarizing axis of the polarizing plate, whereby it is possible to obtain the desired exact black display Further, it is possible to prevent the flicker when alternating current driving of the display is carried out and the observer views the screen in an oblique direction.

EMBODIMENTS

First Embodiment

Figure 12:
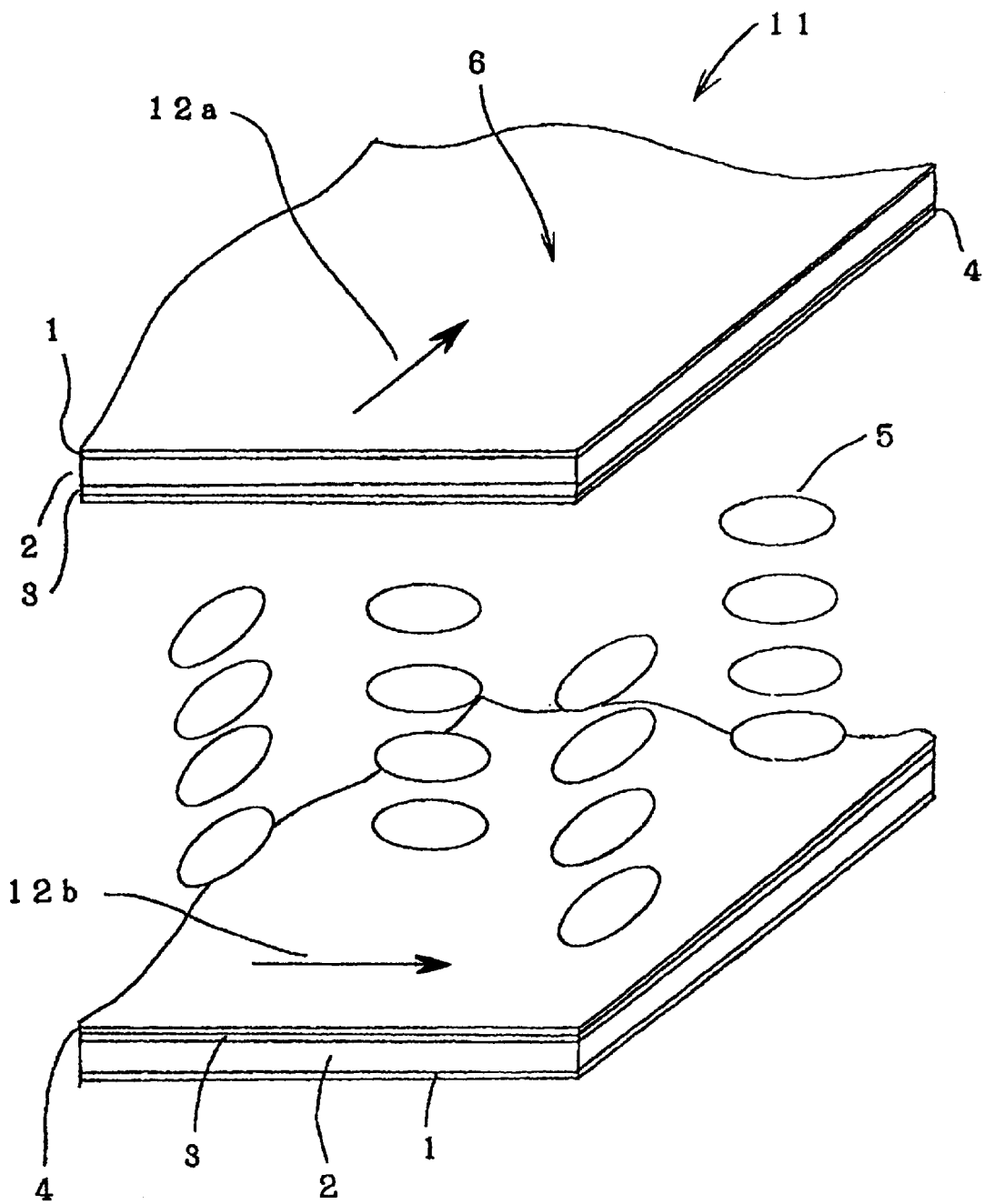
FIG. 12 is a schematic view illustrative of a liquid crystal cell in accordance with the present invention wherein the ferroelectric or anti-ferroelectric liquid crystal is divided into different two types of coexistent areas differing in orientation direction from each other by the right angle in a first embodiment according to the present invention.

A first embodiment according to the present invention will be described with reference to FIG. 12. Indium thin oxide films are deposited on a pair of glass substrates 2 to form transparent electrodes 3. Orientation film materials are applied on the transparent electrodes 3 for subsequent burning the orientation film materials to form orientation films 4 over the transparent electrodes 3. The orientation film on the top substrate is subjected to a rubbing treatment in a first direction 12a whilst the orientation film on the bottom substrate is subjected to another rubbing treatment in a second direction 12b which has the right angle to the direction 12a. Spacer materials are distributed on the peripheral region of the substrate to fabricate a liquid crystal cell. Ferroelectric or anti-ferroelectric liquid crystal is heated up to a temperature at which the liquid crystal enters into an isotropic phase before injection into the cell for subsequent cooled down to the room temperature. The liquid crystal is divided into coexistent two, different types of area wherein first one has the liquid crystal orientated in the first direction and the second one has the liquid crystal orientated in the second direction.

As a liquid crystal, FLC-9200 was used which is commercially available from Hoffmann La Roche and it is disclosed in ISID 94 Digest 430 page that this liquid crystal may be used in DH mode. The above orientation films 4 may be made by spin-coating AL-1051 commercially available from Nippon Synthetic Rubber for subsequent burning at a temperature of 200° C. for one hour. As a spacer material, micro pearls of 3 micrometers commercially available from Shimizu Kasei. The liquid crystal may be heated up to 76° C. prior to the injection into the cell before cooling down to the room temperature.

Figure 16:
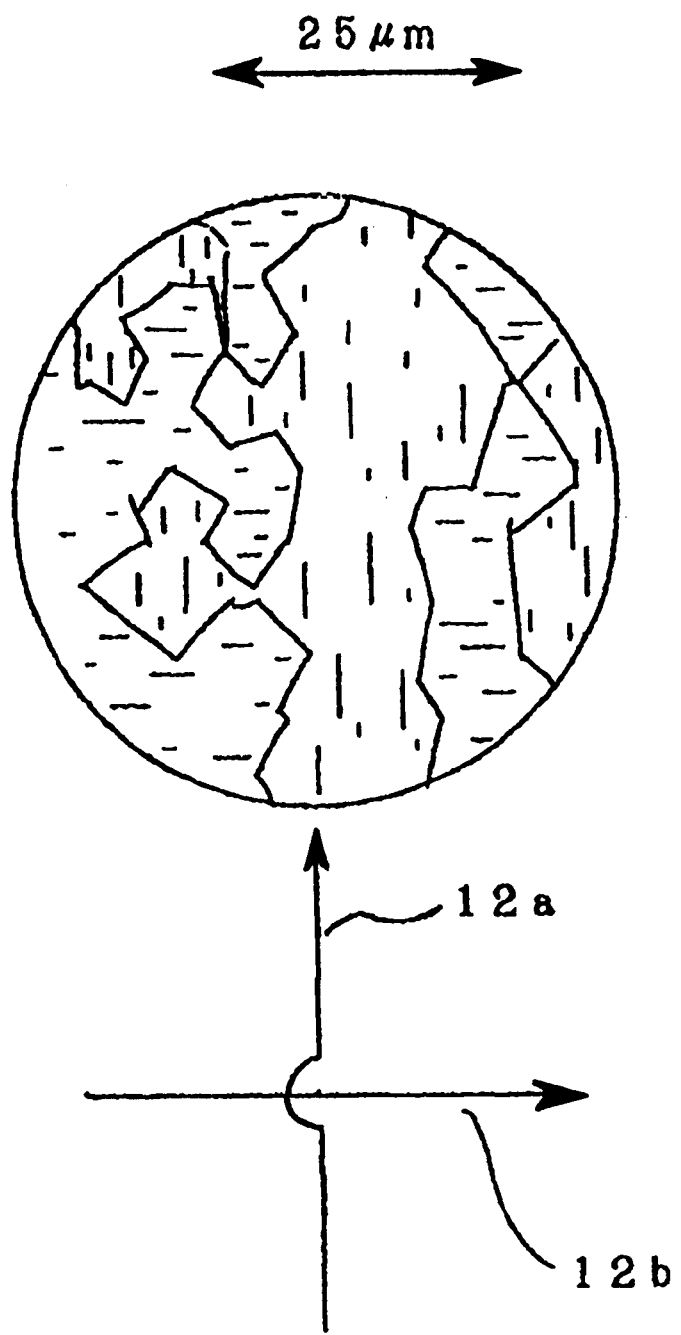
FIG. 16 is a view illustrative of the result of observation by polarizing microscope, wherein the orientations of the liquid crystal are represented by line segments.

The orientation of the liquid crystal was confirmed by use of a Berek compensator and polarizing microscope. It was confirmed that the liquid crystal 5 is divided into the different two types of areas differing in orientation direction by the right angle from each other. A result of the observation by the polarizing microscope is illustrated in FIG. 16, wherein the orientations of the liquid crystal are represented by line segments. The size of the areas is about 25 micrometers/squares.

The ratio of the different two types of areas of the liquid crystal may be changed by changing the intensity of the rubbing treatment to be subjected to the orientation films. In this embodiment, however, the intensity of the rubbing treatment is constant between the two substrates so that the different two types of areas of the liquid crystal have almost the same area.

Figure 17:
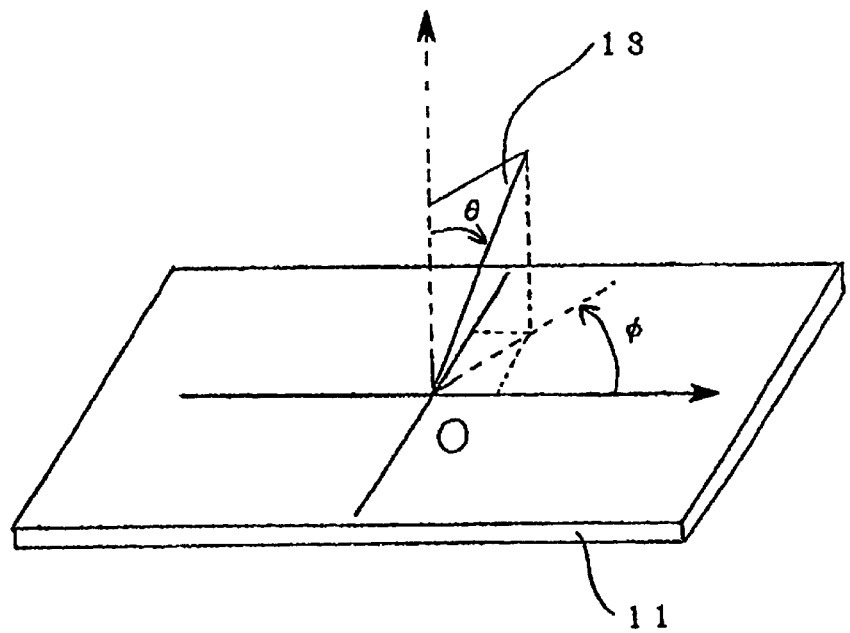
FIG. 17 is a view illustrative of the definitions of the direction of observation 13, the polar angle θ and the azimuth angle φ from a liquid crystal cell 11.
Figure 18:
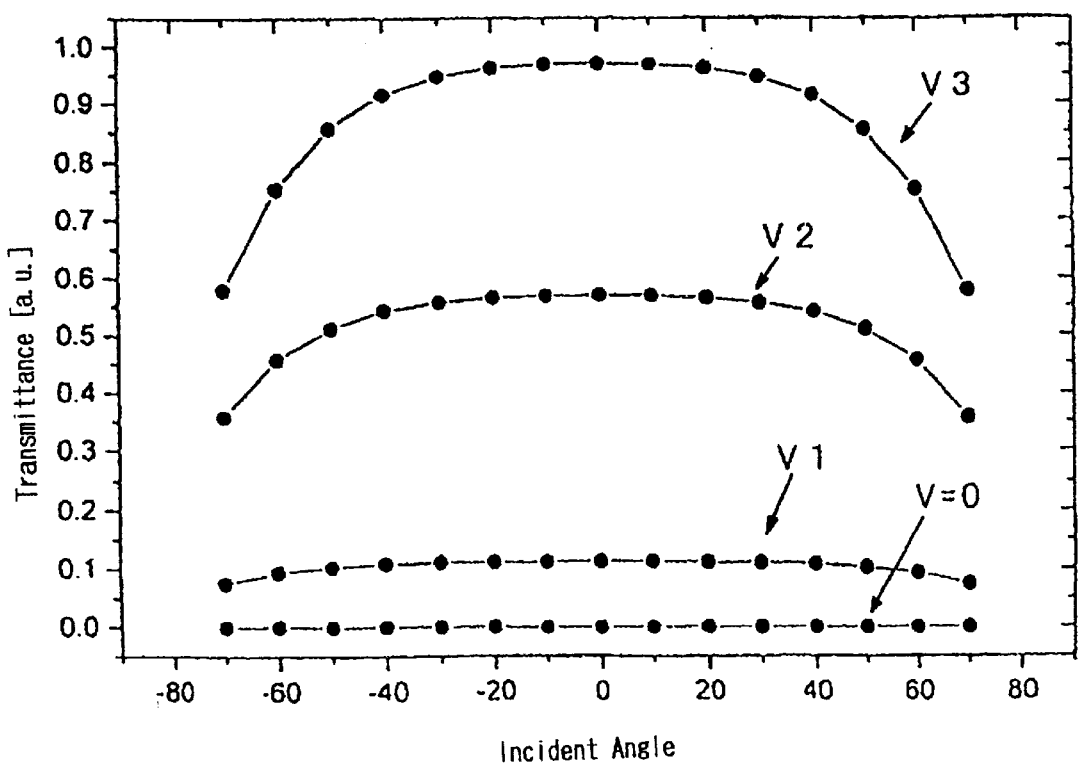
FIG. 18 is a diagram illustrative of the results of the measurements of transmittance versus view angle in accordance with the present invention.

The above liquid crystal cell is placed between a pair of the polarizing plates having polarizing axes vertical to each other. One of the two different orientation directions of the liquid crystal is made correspond to the absorption axis of one of the polarizing plates. Coordinates are set so that the above orientation direction corresponding to the absorption axis is made correspond to the direction of 0 degree–180 degrees as illustrated in FIG. 17. Results of the measurements of transmittance versus view angle are illustrated in FIG. 18 from which it can be understood that the transmittance almost remains unchanged in the range of –40 degrees to +40 degrees without drop of the transmittance in the front direction when gray scale display is made.

Second Embodiment

Figure 13:
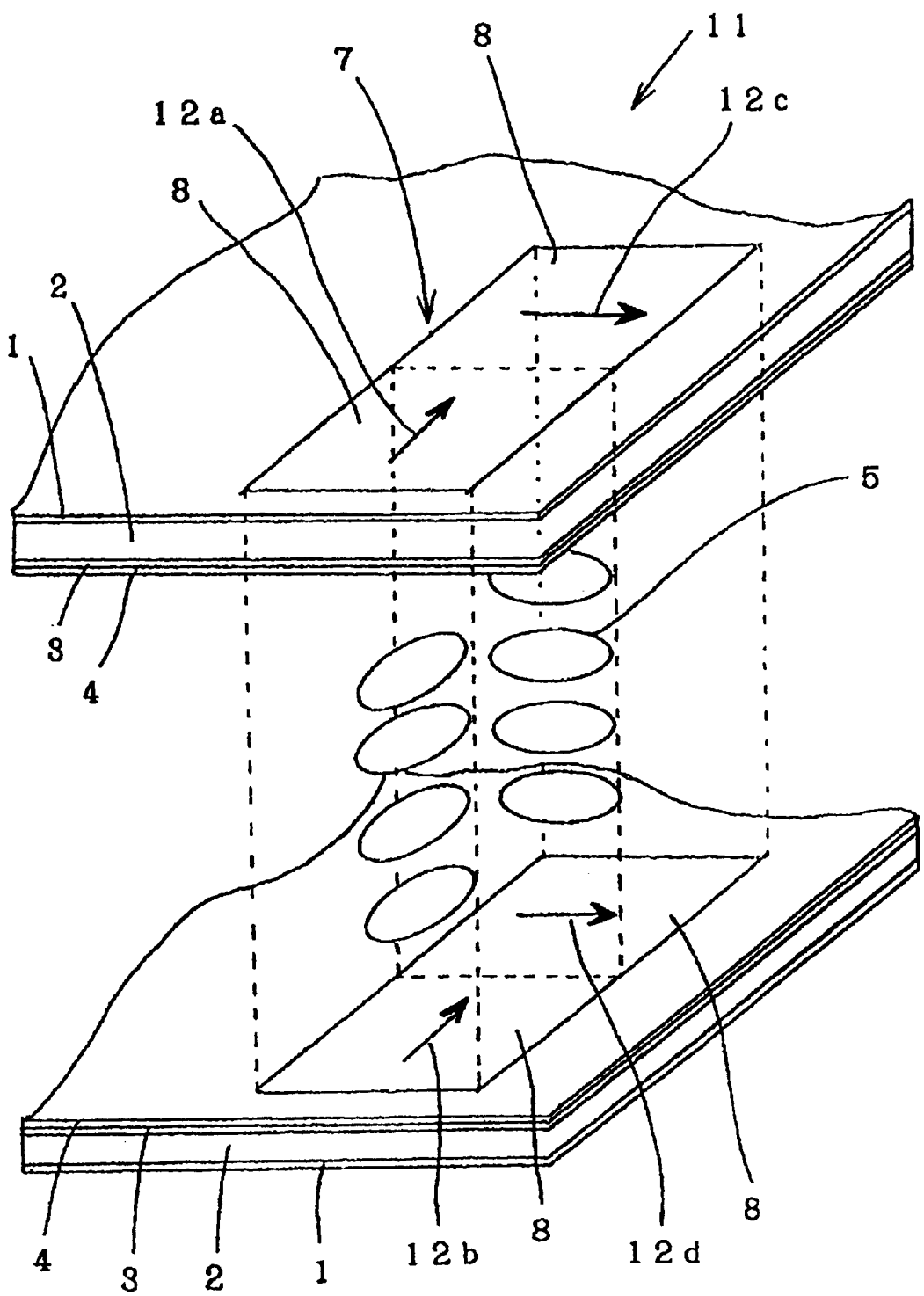
FIG. 13 is a schematic view illustrative of a liquid crystal cell in accordance with the present invention wherein the ferroelectric or anti-ferroelectric liquid crystal is divided into different two types of coexistent areas differing in orientation direction from each other by the right angle in a second embodiment according to the present invention.
Figure 19:
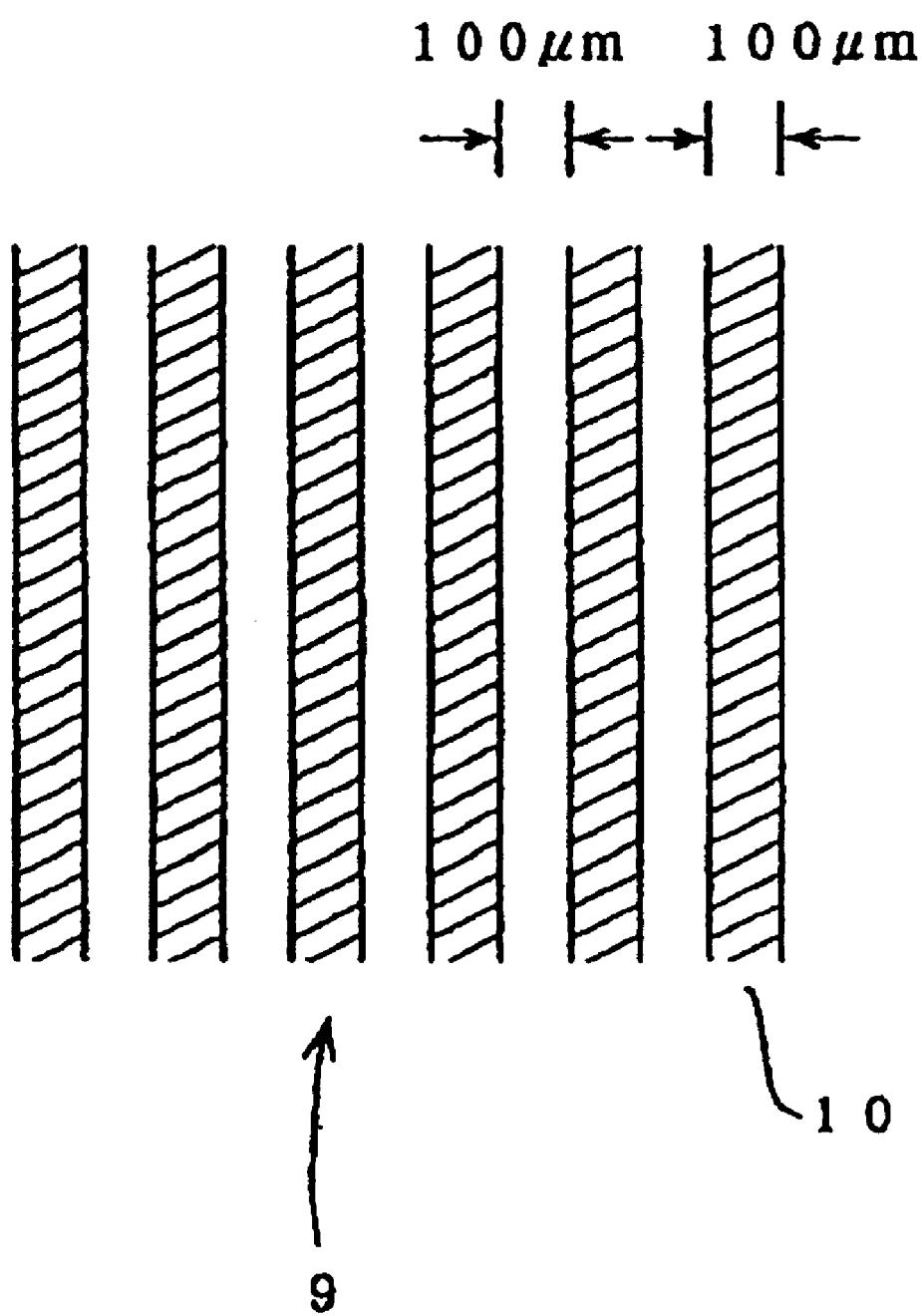
FIG. 19 is a plan view illustrative of a strip pattern used in a second embodiment in accordance with the present invention.

A second embodiment according to the present invention will be described with reference to FIG. 13. Indium thin oxide films are deposited on a pair of glass substrates 2 to form transparent electrodes 3. Orientation film materials are applied on the transparent electrodes 3 for subsequent burning the orientation film materials to form orientation films 4 over the transparent electrodes 3. The orientation film on the top substrate is divided into a plurality of pairs of different two areas for each pixel wherein the first type of the area is subjected to a rubbing treatment in a first direction 12*a* whilst the second type of the area is subjected to another rubbing treatment in a third direction 12*c* which has the right angle to the first direction 12*a*. The orientation film on the bottom substrate is also divided into a plurality of pairs of different two areas for each pixel wherein the first type of the area is subjected to a rubbing treatment in a second direction 12*b* which is parallel to the first direction 12*a* whilst the second type of the area is subjected to another rubbing treatment in a fourth direction 12d which is parallel to the third direction 12c and has the right angle to the second direction 12d. The above rubbing differing in orientation direction may by made by the following two rubbing treatments. In the first step, the orientation film on the top substrate is subjected to the rubbing treatment in the first direction 12a uniformly over the entire parts thereof whilst the orientation film on the bottom substrate is subjected to the rubbing treatment in the second direction 12b uniformly over the entire parts thereof. Photo-resist films applied over the orientation films on the two substrates. The photo-resist films are then exposed to an ultra-violet ray through a strip pattern are having 100 micrometers in width of strips and apertures as illustrated in FIG. 19. Thereafter the development is made to selectively remove the photo-resist films for subsequent baking the same to form a mask pattern 9. The strip pattern has the width of 100 micrometers and the gas of 100 micrometers so as to utilize the superimposition of the optical properties of the different two types of the areas. The gap and the width of the strip pattern are the same as each other so that the different two types of the areas of the liquid crystal have the same ratio in area. Notwithstanding, the ratio in area of the different two types of the areas of the liquid crystal may be changed by changing the ratio of the width to the gap of the strip pattern. The strip pattern is provided on the orientation film on the top substrate which has been already rubbing-treated in the first direction 12a so that the direction of the strip pattern is vertical to the first direction 12a. The strip pattern is provided on the orientation film on the bottom substrate which has been already rubbing-treated in the second direction 12b so that the direction of the strip pattern is vertical to the second direction 12b. By use of the strip patterns, the further ribbing treatment is made so that the orientation film on the top substrate is subjected to a third ribbing treatment in the third direction 12c which is vertical to the first direction 12a whilst the orientation film on the bottom substrate is subjected to a fourth ribbing treatment in the fourth direction 12d which is vertical to the second direction 12b and in parallel to the third direction 12c. The used strip pattern is then removed. Spacer materials are distributed on the peripheral region of the substrate to fabricate a liquid crystal cell. Ferroelectric or anti-ferroelectric liquid crystal is heated up to a temperature at which the liquid crystal enters into an isotropic phase before injection into the cell for subsequent cooled down to the room temperature. The liquid crystal is divided into coexistent two different types of area wherein first one has the liquid crystal orientated in the first direction and the second one has the liquid crystal orientated in the second direction.

As a liquid crystal, FLC-9200 was used which is commercially available from Hoffmann La Roche and it is disclosed in ISID 94 Digest 430 page that this liquid crystal may be used in DBF mode. The above orientation films 4 may be made by spin-coating AL-1051 commercially available from Nippon Synthetic Rubber for subsequent burning at a temperature of 200° C. for one hour. As a spacer material, micro pearls of 3 micrometers commercially available from Shimizu Kasei. The liquid crystal may be heated up to 76° C. prior to the injection into the cell before cooling down to the room temperature.

The orientation of the liquid crystal was confirmed by use of a Berek compensator and polarizing microscope. It was confirmed that liquid crystal is divided into a plurality of pairs of different two areas differing in orientation direction from each other by the right angle.

The above liquid crystal cell is placed between a pair of the polarizing plates having polarizing axes vertical to each other. One of the two different orientation directions of the liquid crystal is made correspond to the absorption axis of one of the polarizing plates. Coordinates are set so that the above orientation direction corresponding to the absorption axis is made correspond to the direction of 0 degree–180 degrees as illustrated in FIG. 17. Results of the measurements of transmittance versus view angle are illustrated in FIG. 18 from which it can be understood that the transmittance almost remains unchanged in the range of −40 degrees to +40 degrees without drop of the transmittance in the front direction when gray scale display is made. The isotropy of the transmittance in the polar angle direction from the front view is further improved as compared to the first embodiment because the different two areas of the liquid crystal differing in orientation direction from each other by the right angle have the same total area as each other.

Third Embodiment

Figure 14:
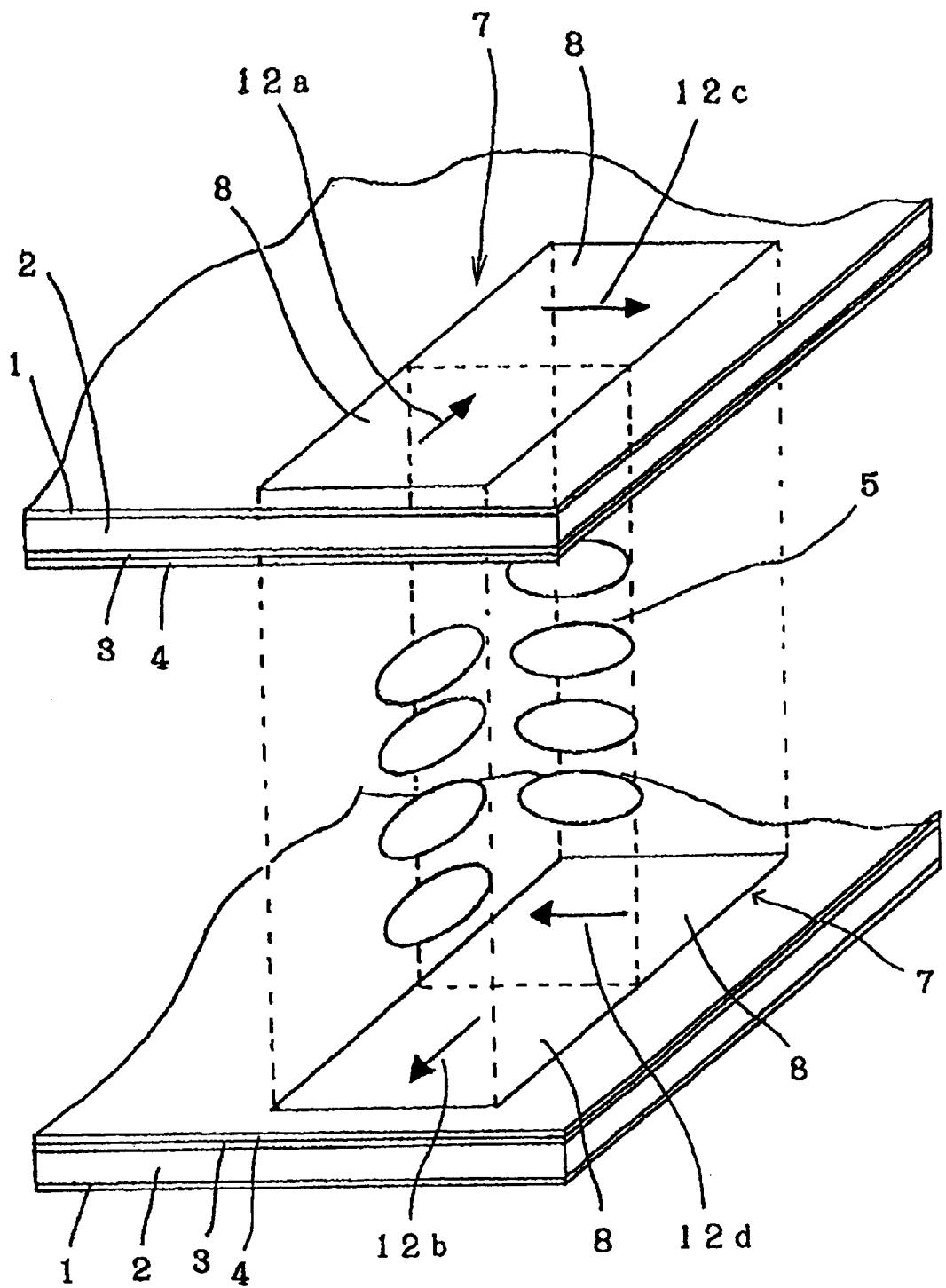
FIG. 14 is a schematic view illustrative of a liquid crystal cell in accordance with the present invention wherein the ferroelectric or anti-ferroelectric liquid crystal is divided into different two types of coexistent areas differing in orientation direction from each other by the right angle in a third embodiment according to the present invention.

A third embodiment according to the present invention will be described with reference to FIG. 14. Indium thin oxide films are deposited on a pair of glass substrates 2 to form transparent electrodes 3. Orientation film materials are applied on the transparent electrodes 3 for subsequent burning the orientation film materials to form orientation films 4 over the transparent electrodes 3. The orientation film on the top substrate is divided into a plurality of pairs of different two areas for each pixel wherein the first type of the area is subjected to a ribbing treatment in a first direction 12a whilst the second type of the area is subjected to another rubbing treatment in a third direction 12c which has the right angle to the first direction 12a. The orientation film on the bottom substrate is also divided into a plurality of pairs of different two areas for each pixel wherein the first type of the area is subjected to a rubbing treatment in a second direction 12b which is anti-parallel to the first direction 12a whilst the second type of the area is subjected to another rubbing treatment in a fourth direction 12d which is anti-parallel to the third direction 12c and has the right angle to the second direction 12d. The above rubbing differing in orientation direction may be made by the following two rubbing treatments. In the first step, the orientation film on the top substrate is subjected to the rubbing treatment in the first direction 12a uniformly over the entire parts thereof whilst the orientation film on the bottom substrate is subjected to the rubbing treatment in the second direction 12b uniformly over the entire parts thereof. Photo-resist films applied over the orientation films on the two substrates. The photo-resist films are then exposed to an ultra-violet ray through a strip pattern 8 having 100 micrometers in width of strips and apertures as illustrated in FIG. 19. Thereafter the development is made to selectively remove the photo-resist films for subsequent baking the same to form a mask pattern 9. The strip pattern has the width of 100 micrometers and the gas of 100 micrometers so as to utilize the superimposition of the optical properties of the different two types of the areas. The gap and the width of the strip pattern are the same as each other so that the different two types of the areas of the liquid crystal have the same ratio in area. Notwithstanding, the ratio in area of the different two types of the areas of the liquid crystal may be changed by changing the ratio of the width to the gap of the strip pattern. The strip pattern is provided on the orientation film on the top substrate which has been already rubbing-treated in the first direction 12a so that the direction of the strip pattern is vertical to the first direction 12a. The strip pattern is provided on the orientation film on the bottom substrate which has been already rubbing-treated in the second direction 12b so that the direction of the strip pattern is vertical to the second direction 12b. By use of the strip patterns, the further ribbing treatment is made so that the orientation film on the top substrate is subjected to a third ribbing treatment in the third direction 12c which is vertical to the first direction 12a whilst the orientation film on the bottom substrate is subjected to a fourth ribbing treatment in the fourth direction 12d which is vertical to the second direction 12b and in anti-parallel to the third direction 12c. The used strip pattern is then removed. Spacer materials are distributed on the peripheral region of the substrate to fabricate a liquid crystal cell. Ferroelectric or anti-ferroelectric liquid crystal is heated up to a temperature at which the liquid crystal enters into an isotropic phase before injection into the cell for subsequent cooled down to the room temperature. The liquid crystal is divided into coexistent two different types of area wherein first one has the liquid crystal orientated in the first direction and the second one has the liquid crystal orientated in the second direction.

As a liquid crystal, FLC-9200 was used which is commercially available from Hoffmann La Roche and it is disclosed in ISID 94 Digest 430 page that this liquid crystal may be used in DHF mode. The above orientation films 4 may be made by spin-coating AL-1051 commercially available from Nippon Synthetic Rubber for subsequent burning at a temperature of 200° C. for one hour. As a spacer material, micro pearls of 3 micrometers commercially available from Shimizu Kasei. The liquid crystal may be heated up to 76° C. prior to the injection into the cell before cooling down to the room temperature.

The orientation of the liquid crystal was confirmed by use of a Berek compensator and polarizing microscope. It was confirmed that liquid crystal is divided into a plurality of pairs of different two areas differing in orientation direction from each other by the right angle.

The above liquid crystal cell is placed between a pair of the polarizing plates having polarizing axes vertical to each other. One of the two different orientation directions of the liquid crystal is made correspond to the absorption axis of one of the polarizing plates. Coordinates are set so that the above orientation direction corresponding to the absorption axis is made correspond to the direction of 0 degree–180 degrees as illustrated in FIG. 17. Results of the measurements of transmittance versus view angle are illustrated in FIG. 18 from which it can be understood that the transmittance almost remains unchanged in the range of −40 degrees to +40 degrees without drop of the transmittance in the front direction when gray scale display is made. The isotropy of the transmittance in the polar angle direction from the front view is further improved as compared to the first embodiment because the different two areas of the liquid crystal differing in orientation direction from each other by the right angle have the same total area as each other.

Fourth Embodiment

Figure 15:
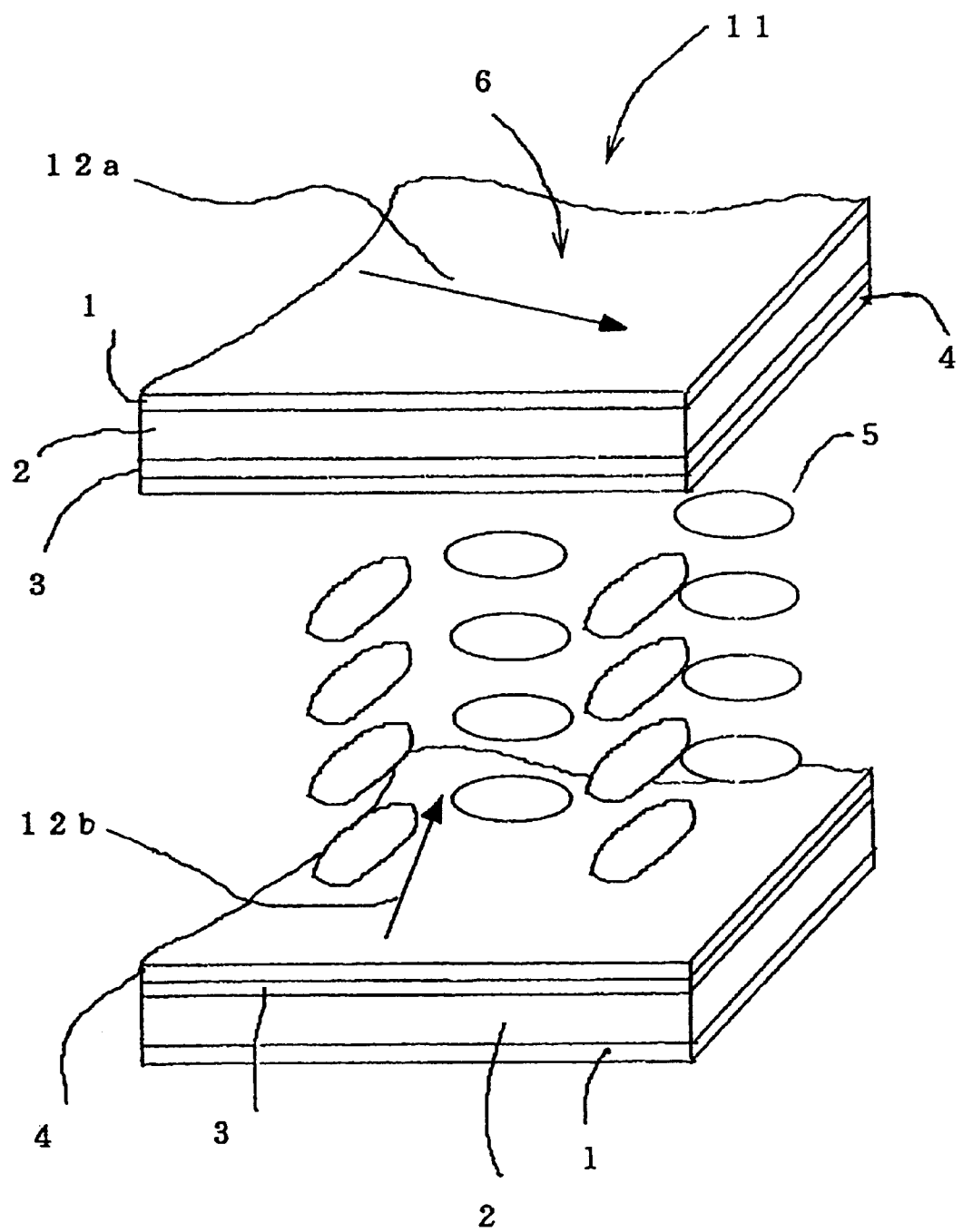
FIG. 15 is a schematic view illustrative of a liquid crystal cell in accordance with the present invention wherein the ferroelectric or anti-ferroelectric liquid crystal is divided into different two types of coexistent areas differing in orientation direction from each other by the right angle in a fourth embodiment according to the present invention.

A fourth embodiment according to the present invention will be described with reference to FIG. 15. Indium thin oxide films are deposited on a pair of glass substrates 2 to form transparent electrodes 3. Orientation film materials are applied on the transparent electrodes 3 for subsequent burning the orientation film materials to form orientation films 4 over the transparent electrodes 3. The ferroelectric or anti-ferroelectric liquid crystal is such a liquid crystal that if only one of the orientation films on the top and bottom substrates is oriented in a reference orientation direction and if the ferroelectric or anti-ferroelectric liquid crystal is injected into the top and bottom substrates, then the ferroelectric or anti-ferroelectric liquid crystal is oriented so that an optical axis of the ferroelectric or anti-ferroelectric liquid crystal is tilted in a plane parallel to the substrate surfaces from the reference orientation direction by an angle α in the clockwise direction. The orientation film on the top substrate is then subjected to a rubbing treatment in an orientation direction 12a which differs and tilts from the reference orientation direction 12b by an angle of 90 degrees+2α in the plane parallel to the substrate surfaces in the clockwise direction. Alternatively, in order to match the different type of the liquid crystal, it is also possible that the orientation film on the top substrate may be subjected to a rubbing treatment in an orientation direction which differs and tilts from the reference orientation direction 12b by an angle of 90 degrees−2α in the plane parallel to the substrate surfaces in the clockwise direction. Further alternatively, in order to match the further different type of the liquid crystal, it is also possible that the orientation film on the top substrate may be subjected to a rubbing treatment in an orientation direction which differs and tilts from the reference orientation direction 12b by an angle of 90 degrees+2α in the plane parallel to the substrate surfaces in the anti-clockwise direction. Furthermore alternatively, in order to match the furthermore different type of the liquid crystal, it is also possible that the orientation film on the top substrate may be subjected to a rubbing treatment in an orientation direction which differs and tilts from the reference orientation direction 12b by an angle of 90 degrees−2α in the plane parallel to the substrate surfaces in the anti-clockwise direction. Spacer materials are distributed on the peripheral region of the : substrate to fabricate a liquid crystal cell. Ferroelectric or anti-ferroelectric liquid crystal is heated up to a temperature at which the liquid crystal enters into an isotropic phase before injection into the cell for subsequent cooled down to the room temperature. The liquid crystal is divided into coexistent two different types of area wherein first one has the liquid crystal orientated in the first direction and the second one has the liquid crystal orientated in the second direction.

As a liquid crystal, anti-ferroelectric liquid crystal CS-4001 was used. The optical axis of the anti-ferroelectric liquid crystal CS-4001 is tilted in the plane parallel to the substrate surfaces from the reference orientation direction by 5 degrees in the clockwise direction. The orientation films on the top and bottom substrates differ in orientation direction from each other by 100 degrees in the clockwise direction in the plane parallel to the substrate surfaces. The above orientation films 4 may be made by spin-coating AL-1251 commercially available from Nippon Synthetic Rubber for subsequent burning at a temperature of 180° C. for one hour. As a spacer material, micro pearls of 2 micrometers commercially available from Shimizu Kasei. The liquid crystal may be heated up to 80° C. prior to the injection into the cell before cooling down to the room temperature at a cooling rate of 0.2° C./min.

The orientation of the liquid crystal was confirmed by use of a Berek compensator and polarizing microscope. It was confirmed that the liquid crystal 5 is divided into the different two types of areas differing in orientation direction by the night angle from each other. A result of the observation by the polarizing microscope is illustrated in FIG. 16, wherein the orientations of the liquid crystal are represented by line segments. The size of the areas is about 25 micrometers/squares. Equitransmittance curves as illustrated in FIG. 11 of the ray of light through a ferroelectric liquid crystal are obtained when a voltage is applied across the liquid crystal. If another voltage having an opposite polarity to the above voltage is applied across the liquid crystal, then equitransmittance curves are obtained which are similar to the equitransmittance curves as illustrated in FIG. 11. This means that it is possible to suppress the flicker.

The angle by which the two orientation films over the substrates differ in orientation direction is decided in accordance with the type of the liquid crystal and may be given by=90°+C×α, where α is the angle by which an optical axis of the ferroelectric or anti-ferroelectric liquid crystal is tilted in the clockwise direction (C=1) or anti-clockwise direction (C=−1) in the plane parallel to the substrate surfaces from the reference orientation direction if only one of the orientation films on the top and bottom substrates is oriented in la reference orientation direction and if the ferroelectric or anti-ferroelectric liquid crystal is injected into the top and bottom substrates.

The ratio of the different two types of areas of the liquid crystal may be changed by changing the intensity of the rubbing treatment to be subjected to the orientation films. In this embodiment, however, the intensity of the rubbing treatment is constant between the two substrates so that the different two types of areas of the liquid crystal have almost the same area.

The above liquid crystal cell is placed between a pair of the polarizing plates having polarizing axes vertical to each other. One of the two different orientation directions of the liquid crystal is made correspond to the absorption axis of one of the polarizing plates. Coordinates are set so that the above orientation direction corresponding to the absorption axis is made correspond to the direction of 0 degree–180 degrees as illustrated in FIG. 17. Results of the measurements of transmittance versus view angle are illustrated in FIG. 18 from which it can be understood that the transmittance almost remains unchanged in the range of −40 degrees to +40 degrees without drop of the transmittance in the front direction when gray scale display is made.

The present invention may be applicable to not only the DHF mode of the ferroelectric liquid crystal but also SSFLC mode of the ferroelectric liquid crystal as well as al single stable mode of the ferroelectric liquid crystal in addition any modes of the anti-liquid crystals.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A ferroelectric liquid crystal display including a pair of first and second substrates placed substantially in parallel to each other to form a space between said first and second substrates and a ferroelectric liquid crystal in said space between said first and second substrates,
   wherein said ferroelectric liquid crystal includes first and second orientation directions of said ferroelectric liquid crystal that are in respective first and second regions that coexist side-by-side in said space and that extend from said first substrate to said second substrate, said two orientation directions differing by 90 degrees from each other in initial orientation direction of an optical axis of ferroelectric liquid crystal molecules therein when no electric field is applied to said ferroelectric liquid crystal immediately after said ferroelectric liquid crystal has been injected into said space between said first and second substrates.

2. The ferroelectric liquid crystal display as claimed in claim 1, further comprising:

a first orientation film extending over an inner surface of said first substrate so that said first orientation film faces said space; and
   a second orientation film extending over an inner surface of said second substrate so that said second orientation film faces said space,
   wherein said first orientation film is divided into first and second areas in each pixel so that said first area is unidirectionally oriented to have the first orientation direction and said second area is unidirectionally oriented to have the second orientation direction, and
   wherein said second orientation film is divided into third and fourth areas in each pixel, and said third area is positioned in correspondence to said first area in a plan view and said fourth area is positioned in correspondence to said second area in said plan view so that said third area is unidirectionally oriented to have a third orientation direction being parallel to said first orientation direction and said fourth area is unidirectionally oriented to have a fourth orientation direction being parallel to said second orientation direction whereby said fourth orientation direction differs from said third orientation direction by a right angle.

3. The ferroelectric liquid crystal display as claimed in claim 1, further comprising:

a first orientation film extending over an inner surface of said first substrate so that said first orientation film faces said space; and
   a second orientation film extending over an inner surface of said second substrate so that said second orientation film faces said space,
   wherein said first orientation film is divided into first and second areas in each pixel so that said first area is unidirectionally oriented to have the first orientation direction and said second area is unidirectionally oriented to have the second orientation direction, and
   wherein said second orientation film is divided into third and fourth areas in each pixel, and said third area is positioned in correspondence to said first area in a plan view and said fourth area is positioned in correspondence to said second area in said plan view so that said third area is unidirectionally oriented to have a third orientation direction being anti-parallel to said first orientation direction and said fourth area is unidirectionally oriented to have a fourth orientation direction being anti-parallel to said second orientation direction whereby said fourth orientation direction differs from said third orientation direction by a right angle.

4. The ferroelectric liquid crystal display as claimed in claim 1, further comprising:

a first polarizing plate provided on an outer surface of said first substrate and said first polarizing plate having a first polarizing direction; and
   a second polarizing plate provided on an outer surface of said second substrate and said second polarizing plate having a second polarizing direction vertical to said first polarizing direction,
   wherein said first polarizing direction corresponds to said first orientation direction.

5. The ferroelectric liquid crystal display as claimed in claim 1, further comprising:

a first polarizing plate provided on an outer surface of said first substrate and said first polarizing plate having a first polarizing direction; and
   a second polarizing plate provided on an outer surface of said second substrate and said second polarizing plate having a second polarizing direction vertical to said first polarizing direction, wherein said first polarizing direction corresponds to an initial orientation direction of any one of said regions.

6. The ferroelectric liquid crystal display as claimed in claim 1, further comprising:

a first polarizing plate provided on an outer surface of said first substrate and said first polarizing plate having a first polarizing direction; and a second polarizing plate provided on an outer surface of said second substrate and said second polarizing plate having a second polarizing direction vertical to said first polarizing direction, wherein said second polarizing direction corresponds to an initial orientation direction of any one of said regions.

7. The ferroelectric liquid crystal display as claimed in claim 1, further comprising:

a first polarizing plate provided on an outer surface of said first substrate and said first polarizing plate having a first polarizing direction; and a second polarizing plate provided on an outer surface of said second substrate and said second polarizing plate having a second polarizing direction in parallel to said first polarizing direction, wherein said first and second polarizing directions correspond to an initial orientation direction of any one of said regions.

8. An anti-ferroelectric liquid crystal display including a pair of first and second substrates placed substantially in parallel to each other to form a space between said first and second substrates and an anti-ferroelectric liquid crystal in said space between said first and second substrates, wherein said ant-ferroelectric liquid crystal includes first and second orientation directions of said ferroelectric liquid crystal that are in respective first and second regions that coexist side-by-side in said space and that extend from said first substrate to said second substrate, said two orientation directions differing by 90 degrees from each other in initial orientation direction of an optical axis of anti-ferroelectric liquid crystal molecules therein when no electric field is applied to said ant-ferroelectric liquid crystal immediately after said anti-ferroelectric liquid crystal has been injected into said space between said first and second substrates.

9. The anti-ferroelectric liquid crystal display as claimed in claim 8, further comprising:

a first orientation film extending over an inner surface of said first substrate so that said first orientation film faces said space; and a second orientation film extending over an inner surface of said second substrate so that said second orientation film faces said space, wherein said first orientation film is divided into first and second areas in each pixel so that said first area is unidirectionally oriented to have the first orientation direction and said second area is unidirectionally oriented to have the second orientation direction, and wherein said second orientation film is divided into third and fourth areas in each pixel, and said third area is positioned in correspondence to said first area in a plan view and said fourth area is positioned in correspondence to said second area in said plan view so that said third area is unidirectionally oriented to have a third orientation direction being parallel to said first orientation direction and said fourth area is unidirectionally oriented to have a fourth orientation direction being parallel to said second orientation direction whereby said fourth orientation direction differs from said third orientation direction by a right angle.

10. The anti-ferroelectric liquid crystal display as claimed in claim 8, further comprising:

a first orientation film extending over an inner surface of said first substrate so that said first orientation film faces said space; and a second orientation film extending over an inner surface of said second substrate so that said second orientation film faces said space, wherein said first orientation film is divided into first and second areas in each pixel so that said first area is unidirectionally oriented to have the first orientation direction and said second area is unidirectionally oriented to have the second orientation direction, and wherein said second orientation film is divided into third and fourth areas in each pixel, and said third area is positioned in correspondence to said first area in a plan view and said fourth area is positioned in correspondence to said second area in said plan view so that said third area is unidirectionally oriented to have a third orientation direction being anti-parallel to said first orientation direction and said fourth area is unidirectionally oriented to have a fourth orientation direction being anti-parallel to said second orientation direction whereby said fourth orientation direction differs from said third orientation direction by a right angle.

11. The anti-ferroelectric liquid crystal display as claimed in claim 8, further comprising:

a first polarizing plate provided on an outer surface of said first substrate and said first polarizing plate having a first polarizing direction; and a second polarizing plate provided on an outer surface of said second substrate and said second plate having a second polarizing direction vertical to said first polarizing direction, wherein said first polarizing direction corresponds to said first orientation direction.

12. The anti-ferroelectric liquid crystal display as claimed in claim 8, further comprising:

a first polarizing plate provided on an outer surface of said first substrate and said first polarizing plate having a first polarizing direction; and a second polarizing plate provided on an outer surface of said second substrate and said second polarizing plate having a second polarizing direction vertical to said first polarizing direction, wherein said first polarizing direction corresponds to an initial orientation direction of any one of said regions.

13. The anti-ferroelectric liquid crystal display as claimed in claim 8, further comprising:

a first polarizing plate provided on an outer surface of said first substrate and said first polarizing plate having a first polarizing direction; and a second polarizing plate provided on an outer surface of said second substrate and said second polarizing plate having a second polarizing direction vertical to said first polarizing direction, wherein said second polarizing direction corresponds to an initial orientation direction of any one of said regions.

14. The anti-ferroelectric liquid crystal display as claimed in claim 8, further comprising:

a first polarizing plate provided on an outer surface of said first substrate and said first polarizing plate having a first polarizing direction; and a second polarizing plate provided on an outer surface of said second substrate and said second polarizing plate having a second polarizing direction in parallel to said first polarizing direction, wherein said first and second polarizing directions correspond to an initial orientation direction of any one of said regions.

15. A ferroelectric liquid crystal display comprising:

a pair of first and second substrates placed substantially in parallel to each other to form a space between said first and second substrates;

a first orientation film extending over an inner surface of said first substrate so that said first orientation film faces said space;

a second orientation film extending over an inner surface of said second substrate so that said second orientation film faces said space; and a ferroelectric liquid crystal provided in said space between said first and second orientation films, wherein first regions of said first and second orientation films that are in registration with each other are unidirectionally oriented to have a first orientation direction and second regions of said first and second orientation films that are in registration with each other and separate from said first regions are unidirectionally oriented to have a second orientation direction which differs from said first orientation direction by a right angle.

16. The ferroelectric liquid crystal display as claimed in claim 15, wherein said ferroelectric liquid crystal includes the first and second orientation directions of said ferroelectric liquid crystal that are in respective first and second regions that coexist side-by-side in said space and that extend from said first substrate to said second substrate, said two orientation directions differing by 90 degrees from each other in initial orientation direction of an optical axis of ferroelectric liquid crystal molecules therein when no electric field is applied to said ferroelectric liquid crystal immediately after said ferroelectric liquid crystal has been injected into said space between said first and second substrates.

17. The ferroelectric liquid crystal display as claimed in claim 15, further comprising:

a first polarizing plate provided on an outer surface of said first substrate and said first polarizing plate having a first polarizing direction and a second polarizing plate provided on an outer surface of said second substrate and said second polarizing plate having a second polarizing direction vertical to said first polarizing direction, wherein said first polarizing direction corresponds to said first orientation direction.

18. The ferroelectric liquid crystal display as claimed in claim 15, further comprising:

a first polarizing plate provided on an outer surface of said first substrate and said first polarizing direction; and a second polarizing plate provided on an outer surface of said second substrate and said second polarizing plate having a second polarizing direction vertical to said first polarizing direction, wherein said first polarizing direction corresponds to said second orientation direction.

19. The ferroelectric liquid crystal display as claimed in claim 15, further comprising:

a first polarizing plate provided on an outer surface of said first substrate and said first polarizing plate having a first polarizing direction; and a second polarizing plate provided on an outer surface of said second substrate and said second polarizing plate having a second polarizing direction vertical to said first polarizing direction, wherein said second polarizing direction corresponds to said first orientation direction.

20. The ferroelectric liquid crystal display as claimed in claim 15, further comprising:

a first polarizing plate provided on an outer surface of said first substrate and said first polarizing plate having a first polarizing direction; and a second polarizing plate provided on an outer surface of said second substrate and said second polarizing plate having a second polarizing direction vertical to said first polarizing direction, wherein said second polarizing direction corresponds to said second orientation direction.

21. The ferroelectric liquid crystal display as claimed in claim 15, flier comprising:

a first polarizing plate provided on an outer surface of said first substrate and said first polarizing plate having a first polarizing direction; and a second polarizing plate provided on an outer surface of said second substrate and said second polarizing plate having a second polarizing direction in parallel to said first polarizing direction, wherein said first and second polarizing directions correspond to said first orientation direction.

22. The ferroelectric liquid crystal display as claimed in claim 15, further comprising:

a first polarizing plate provided on an outer surface of said first substrate and said first polarizing plate having a first polarizing direction and a second polarizing plate provided on an outer surface of said second substrate and said second polarizing plate having a second polarizing direction in parallel to said first polarizing direction, wherein said first and second polarizing directions correspond to said second orientation direction.

23. The ferroelectric liquid crystal display as claimed in claim 16, wherein said first and second regions have substantially the same area as each other.

24. The ferroelectric liquid crystal display as claimed in claim 16, wherein said first and second regions are uniformly distributed.

25. An anti-ferroelectric liquid crystal display comprising:

a pair of first and second substrates placed substantially in parallel to each other to form a space between said first and second substrates;

a first orientation film extending over an inner surface of said first substrate so that said first orientation film faces said space;

a second orientation film extending over an inner surface of said second substrate so that said second orientation film faces said space; and an anti-ferroelectric liquid crystal provided in said space between said first and second orientation films, wherein first regions of said first and second orientation films that are in registration with each other are unidirectionally oriented to have a first orientation direction and second regions of said first and second orientation films that are in registration with each other and separate from said first regions are unidirectionally oriented to have a second orientation direction which differs from said first orientation direction by a right angle.

26. The ferroelectric liquid crystal display as claimed in claim 25, wherein said anti-ferroelectric liquid crystal includes the first and second orientation directions of said ferroelectric liquid crystal that are in respective first and second regions that coexist side-by-side in said space and that extend from said first substrate to said second substrate, said two orientation directions differing by 90 degrees from each other in initial orientation direction of an optical axis of anti-ferroelectric liquid crystal molecules therein when no electric field is applied to said anti-ferroelectric liquid crystal immediately after said anti-ferroelectric liquid crystal has been injected into said space between said first and second substrates.

27. The anti-ferroelectric liquid crystal display as claimed in claim 25, further comprising:

a first polarizing plate provided on an outer surface of said first substrate and said first polarizing plate having a first polarizing direction; and a second polarizing plate provided on an outer surface of said second substrate and said second polarizing plate having a second polarizing direction vertical to said first polarizing direction, wherein said first polarizing direction corresponds to said first orientation direction.

28. The anti-ferroelectric liquid crystal display as claimed in claim 25, further comprising:

a first polarizing plate provided on an outer surface of said first substrate and said first polarizing plate having a first polarizing direction and a second polarizing plate provided on an outer surface of said second substrate and said second polarizing plate having a second polarizing direction vertical to said first polarizing direction, wherein said first polarizing direction corresponds to said second orientation direction.

29. The anti-ferroelectric liquid crystal display as claimed in claim 25, further comprising;

a first polarizing plate provided on an outer surface of said first substrate and said first polarizing plate having a first polarizing direction; and a second polarizing plate provided on an outer surface of said second substrate and said second polarizing plate having a second polarizing direction vertical to said first polarizing direction, wherein said second polarizing direction, corresponds to said first orientation direction.

30. The anti-ferroelectric liquid crystal display as claimed in claim 25, further comprising:

a first polarizing plate provided on an outer surface of said first substrate and said first polarizing plate having a first polarizing direction and a second polarizing plate provided on an outer surface of said second substrate and said second polarizing plate having a second polarizing direction vertical to said first polarizing direction, wherein said second polarizing direction corresponds to said second orientation direction.

31. The anti-ferroelectric liquid crystal display as claimed in claim 25, further comprising:

a first polarizing plate provided on an outer surface of said first substrate and said first polarizing plate having a first polarizing direction; and a second polarizing plate provided on an outer surface of said second substrate and said second polarizing plate having a second polarizing direction in parallel to said first polarizing direction, wherein said first and second polarizing directions correspond to said first orientation direction.

32. The anti-ferroelectric liquid crystal display as claimed in claim 25, further comprising:

a first polarizing plate provided on an outer surface of said first substrate and said first polarizing plate having a first polarizing direction; and a second polarizing plate provided on an outer surface of said second substrate and said second polarizing plate having a second polarizing direction in parallel to said first polarizing direction, wherein said first and second polarizing directions correspond to said second orientation direction.

33. The anti-ferroelectric liquid crystal display as claimed in claim 26, wherein said first and second regions have substantially the same area as each other.

34. The anti-ferroelectric liquid crystal display as claimed in claim 26, wherein said first and second regions are uniformly distributed.

* * * * *